US005943734A

United States Patent [19]

Pearce

[11] Patent Number: 5,943,734

[45] Date of Patent: Aug. 31, 1999

[54] MOUNT FOR MOUNTING A CASTER WHEEL TO A WHEELCHAIR

[75] Inventor: Tony M. Pearce, Alpine, Utah

[73] Assignee: Teksource, LC, Draper, Utah

[21] Appl. No.: 08/783,375

[22] Filed: Jan. 13, 1997

Related U.S. Application Data

[63] Continuation-in-part of application No. 08/420,986, Apr. 10, 1995, Pat. No. 5,667,235, which is a continuation-in-part of application No. 08/098,426, Jul. 27, 1993, abandoned.

[51] Int. Cl.[6] ..................... B60B 33/00

[52] U.S. Cl. ..................... 16/31 A; 16/29; 16/18 R

[58] Field of Search ..................... 16/31 A, 31 R, 16/29, 19, 38, 39, 18 R

[56] References Cited

U.S. PATENT DOCUMENTS 5,524,322 6/1996 Muehlen ..................... 16/29

*Primary Examiner*—Chuck Y. Mah
*Attorney, Agent, or Firm*—Daniel McCarthy; Mark Sandbaken; Brick Power

[57] ABSTRACT

Multi-adjustable wheelchair with adjustability features which accommodate the physical size and comfort of the wheelchair user is disclosed and claimed. The wheelchair includes (1) wheelchair frame width adjustment, (2) wheelchair rear axle position adjustment, (3) wheelchair seat height and bucketing angle adjustment, (4) wheelchair seat base width and length adjustment, (5) wheelchair seat back angle adjustment and (6) wheelchair seat fore and aft position adjustment. The wheelchair also includes a truss structure wheelchair wheel caster fork that is lightweight, attractive, strong, durable, and inexpensive to produce.

9 Claims, 15 Drawing Sheets

MOUNT FOR MOUNTING A CASTER WHEEL TO A WHEELCHAIR

REQUEST FOR CONTINUITY

This patent application is a continuation-in-part of U.S. patent application Ser. No. 08/420,986 which was filed on Apr. 10, 1995 and which is now U.S. Pat. No. 5,667,235, which was a continuation-in-part of U.S. patent application Ser. No. 08/098,426 which was filed on Jul. 27, 1993, now abandoned.

I. BACKGROUND OF THE INVENTION

A. Field of the Invention

This invention relates to the field of wheelchairs which have adjustability features to accommodate the physical size and comfort of the wheelchair user. More particularly, this invention relates to a wheelchair providing (1) wheelchair frame width adjustment, (2) wheelchair rear axle position adjustment, (3) wheelchair seat height and bucketing angle adjustment, (4) wheelchair seat base width and length adjustment, (5) wheelchair seat back angle-adjustment and (6) wheelchair seat fore and aft position adjustment. The invention also includes a truss structure wheelchair caster fork for attaching a caster wheel to a wheelchair.

B. The Background Art

Figure 8:
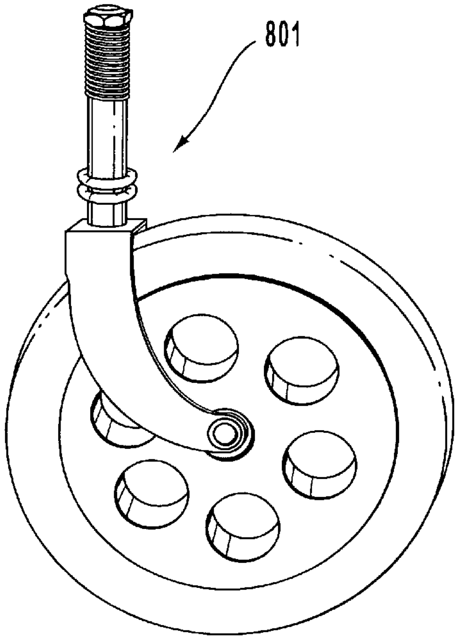
FIG. 8 (PRIOR ART)
Figure 9:
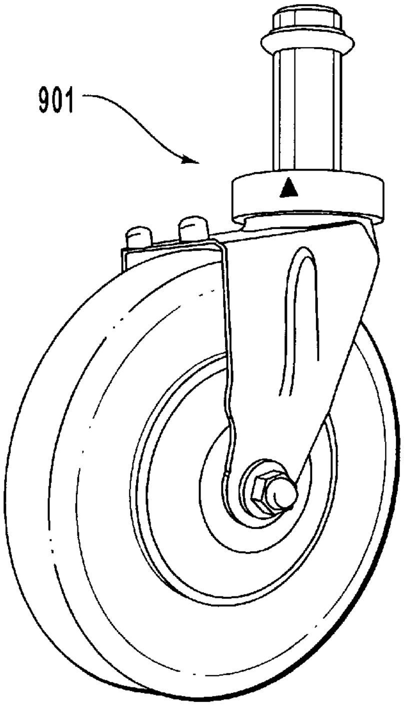
FIG. 9 (PRIOR ART)
Figure 10:
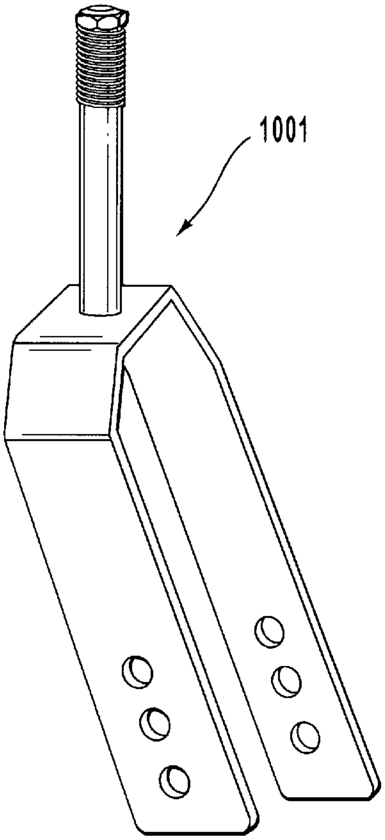
FIG. 10 (PRIOR ART)

In the prior art, caster wheels were used on wheelchairs, but they were typically heavy, unsightly and expensive. FIGS. 8–10 depict prior art wheelchair casters.

In prior wheelchair frames, the width or the distance between the wheelchair wheels was typically set during manufacture. Wheelchairs were made in different widths by lengthening or shortening the cross member tubes. A user of a prior wheelchair generally could not make any wheelchair frame width adjustment after purchase of the wheelchair.

A few prior wheelchairs have been capable of limited width adjustment by the use of replaceable cross members or length-adjustable cross members. This adjustment was only possible, however, on parallel-side frame wheelchairs with frames designed with such adjustment in mind (e.g., folding chairs), but not on rigid tubular wheelchair frames or on shell or parallel-plate truss structure wheelchair frames. The adjustment provided by prior wheelchairs was difficult for the user of a wheelchair to make without assistance and often difficult to set accurately. Further, structural strength of prior wheelchairs was adversely affected by such width adjustment mechanisms.

Some prior wheelchairs have adjustable rear wheel axle positioning. Axle adjustment in the prior is typically accomplished by (1) having multiple axle receiver holes for installation of the axle in various positions, (2) having a single axle receiver hole in a lug that can be moved to a number of different holes in the wheelchair frame or in an attachment to the wheelchair frame, or (3) having a lug attached to a horizontal slot in a plate, the plate being bolted to the tubes of the wheelchair frame. These prior axle positioning adjustment features may provide horizontal or vertical adjustment or both. These prior axle adjustment systems typically offered limited adjustment, were difficult to use and prone to inaccurate adjustment, and often lacked the strength and durability of non-adjustable axle assemblies.

Typical prior wheelchairs do not offer adjustment of the wheelchair seat relative to the wheelchair frame. U.S. Pat. No. 5,176,393 to Robertson et al. (which is hereby incorporated by reference in its entirety) provides height adjustment by using a seat mounted on telescoping tube assemblies. No other prior seat height adjustment or bucketing angle adjustment (if only the front or rear of the seat adjusts) features are known. Instead of providing seat height adjustment, many prior wheelchairs offered footrests with telescoping length adjustment. The one known prior height and bucketing angle adjustment mechanism was inadequate in the range and type of adjustment offered, and it tended to slip out of adjustment over time.

Seat base width and length in the prior was set at the time of wheelchair manufacture because all known prior wheelchairs used the wheelchair frame members as a base for the seat. Thus because the frame width and length could not be adjusted, the seat base width and length could not be adjusted. These adjustments are desirable because of the wide variations in dimensions of various people and the tendency of the dimensions of any particular person to change over time.

Some prior wheelchair manufacturers offered the wheelchair user the opportunity to specify a seat back angle which would be incorporated into the wheelchair at the time of manufacture. Thereafter, seat back angle was fixed and could not be adjusted. A few prior wheelchairs offered a reclinable seat back feature, but none offered fine, non-reclining seat back angle adjustment. Thus, effective non-reclining adjustment of seat back angle was absent from the prior wheelchairs.

The fore and aft position of a wheelchair seat relative to the wheelchair frame and associated change in the center of gravity of the wheelchair for user comfort and wheelchair stability was not known in the wheelchair art prior to the invention.

The lack of substantial adjustability of prior wheelchairs results in most wheelchair users suffering from poor wheelchair fit, increased difficulty achieving mobility, physical discomfort, and even some degradation of physical condition. A wheelchair readily adaptable to the ergonomic needs of wheelchair users was not available in the prior wheelchairs.

II. SUMMARY OF THE INVENTION

The prior wheelchair limitations are overcome by the multi-adjustable wheelchair of the present invention that provides (1) wheelchair frame width adjustment, (2) wheelchair rear axle position adjustment, (3) wheelchair seat height and bucketing angle adjustment, (4) wheelchair seat base width and length adjustment, (5) wheelchair seat back angle adjustment and (6) wheelchair seat fore and aft position adjustment. Additionally, the prior art unsightly, expensive and heavy caster wheels are replaced by a caster fork that is lightweight, strong, durable, attractive and inexpensive to produce.

The invention achieves adjustable wheelchair width by providing stacking or nesting of blocks attachable to the sides of the wheelchair frame and onto which a wheelchair axle receiver and wheelchair axle and wheel assembly may be mounted. Utilizing additional blocks results in a wider wheelchair and utilizing fewer blocks results in a narrower wheelchair.

Wheelchair rear axle position adjustment is accomplished with a rotatable member with at least one receptacle for receiving a lug, into which lug the axle is inserted. This device permits both vertical and fore and aft adjustment of the wheelchair rear wheels resulting in changes in the height and center of gravity of the wheelchair. An athletic wheelchair user may adjust the center of gravity using this feature so that wheelchair tipping is encouraged, thus easing movement of the wheelchair over curbs or other obstacles. Enfeebled wheelchair users may adjust the wheelchair center of gravity for maximum stability to prevent potentially dangerous wheelchair tipping.

Adjustment of wheelchair seat height relative to wheelchair frame and bucketing angle of the wheelchair seat is accomplished in the invention by a rigid member having a plurality of fastener holes to which the wheelchair seat may be secured. The invention permits raising and lowering of the wheelchair seat and securing the wheelchair seat in a position tilted forward or backward at the angle desired and will not move out of position over time.

The invention permits wheelchair seat base width and length adjustment by providing a seat beam on each side of the wheelchair seat, the seat beam being attached to cross beams which are slidingly or telescopingly adjustable. Seat base width adjustment is accomplished by sliding movement of the cross beams. Seat base length is adjusted by relocating cross beams along the seat beam.

Wheelchair seat back angle adjustment in less than 2 degree increments is achieved in the invention by the use of a polygonal-shaped (preferably triangular) structure at the junction of the seat and seat back with one or more of the sides of the polygon being length adjustable.

The invention also provides wheelchair seat fore and aft position adjustment relative to the frame by using a seat base which is a separate member from the wheelchair frame, the seat base being slidable with respect to the frame within a slot or upon a rail and securable with respect to the frame by the use of one or more retainers.

III. BRIEF DESCRIPTION OF THE DRAWINGS

Figure 1A:
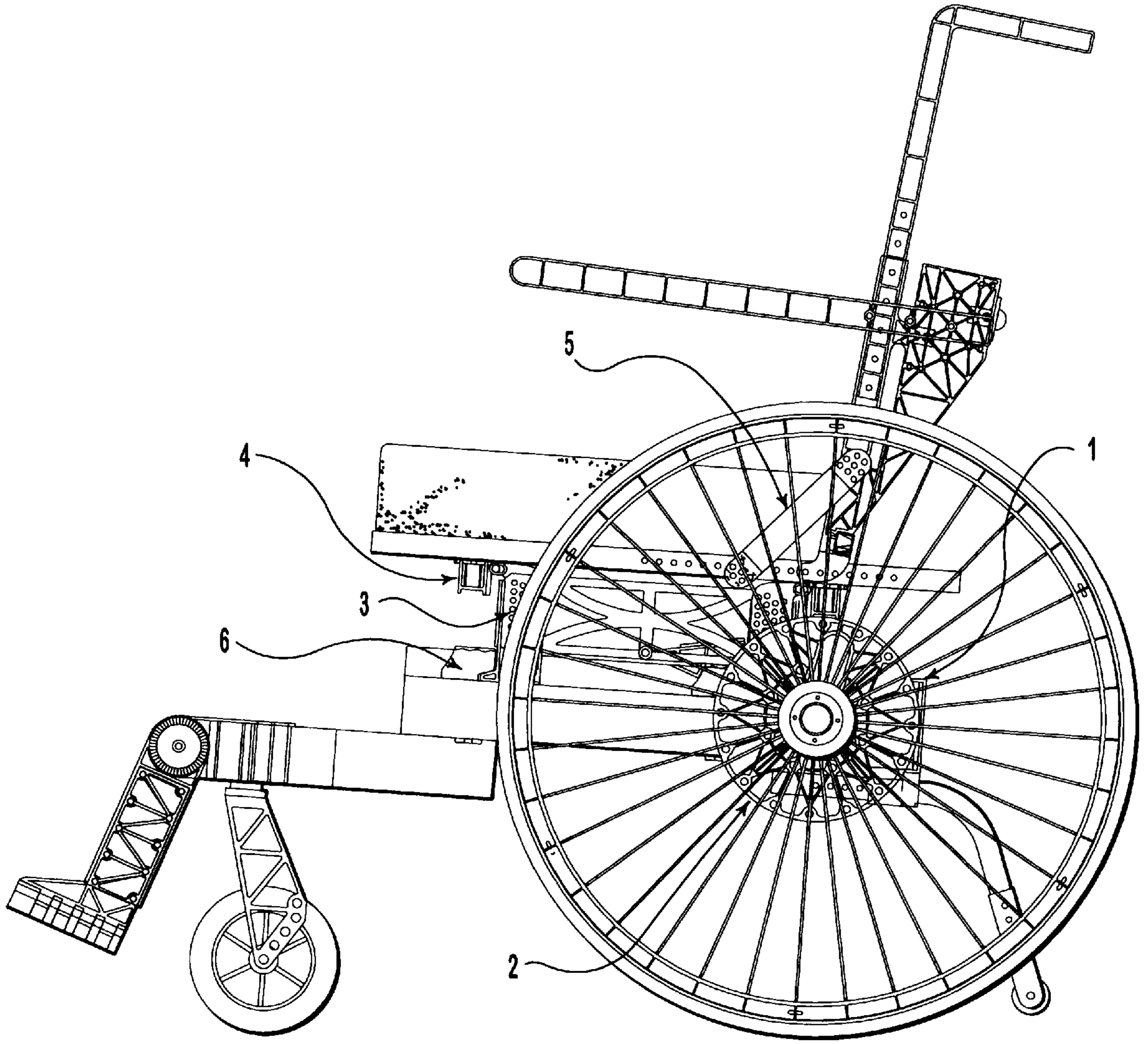

FIG. 1*a* depicts a side view of a wheelchair embodying all six (6) adjustment features of the present invention.

Figure 1B:
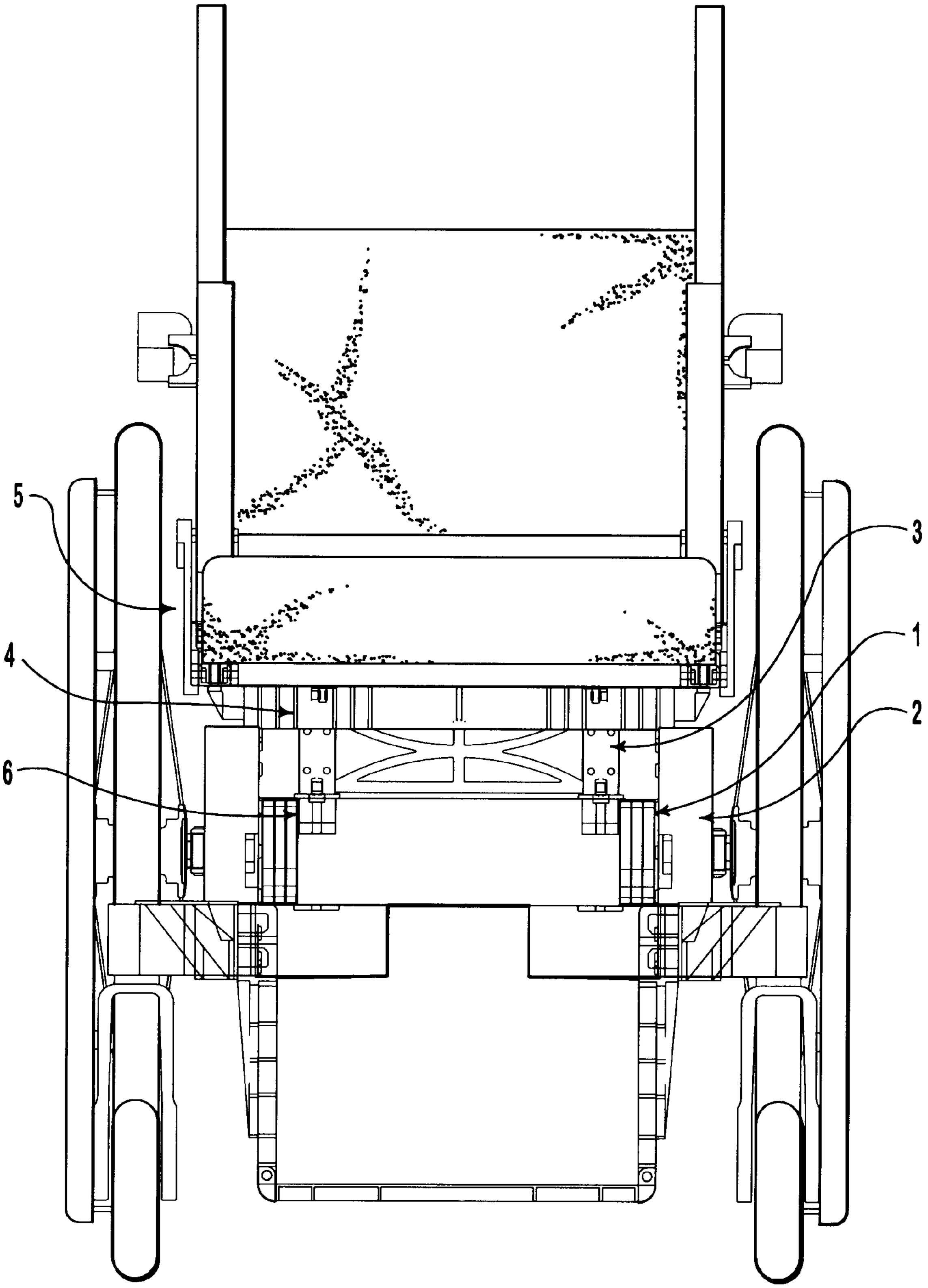

FIG. 1*b* depicts a rear view of a wheelchair embodying all six (6) adjustment features of the present invention.

Figure 2B:
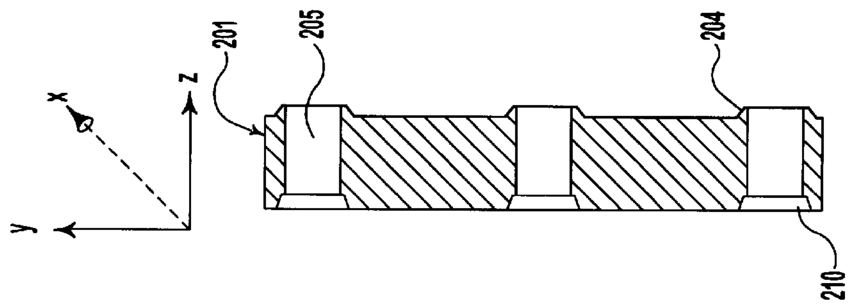
Figure 2A:
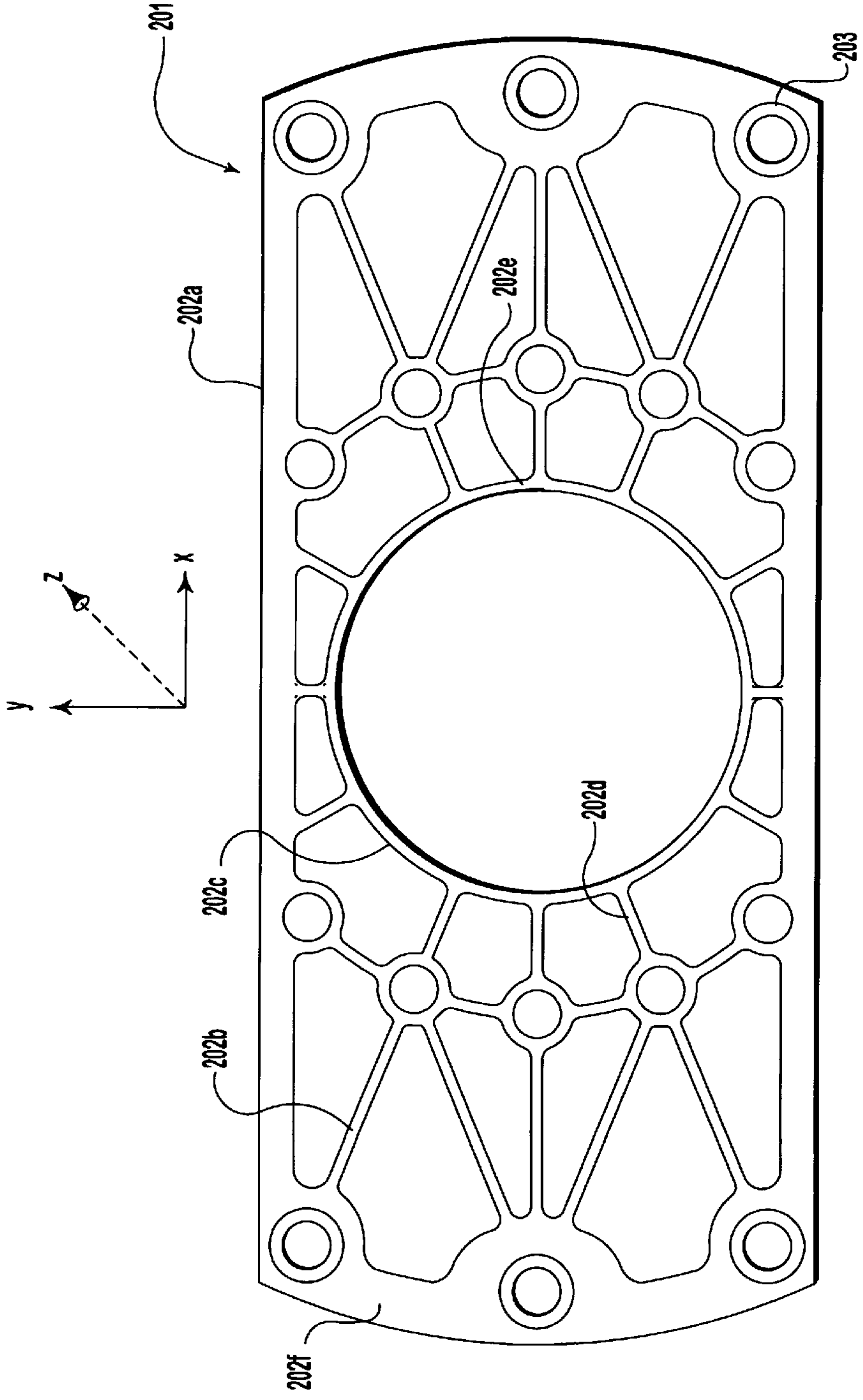

FIG. 2*a* depicts a plan view of a stacking or nesting block used in the preferred embodiment of the invention to provide wheelchair frame width adjustment.

FIG. 2*b* depicts a side view of a stacking or nesting block.

Figure 2C:
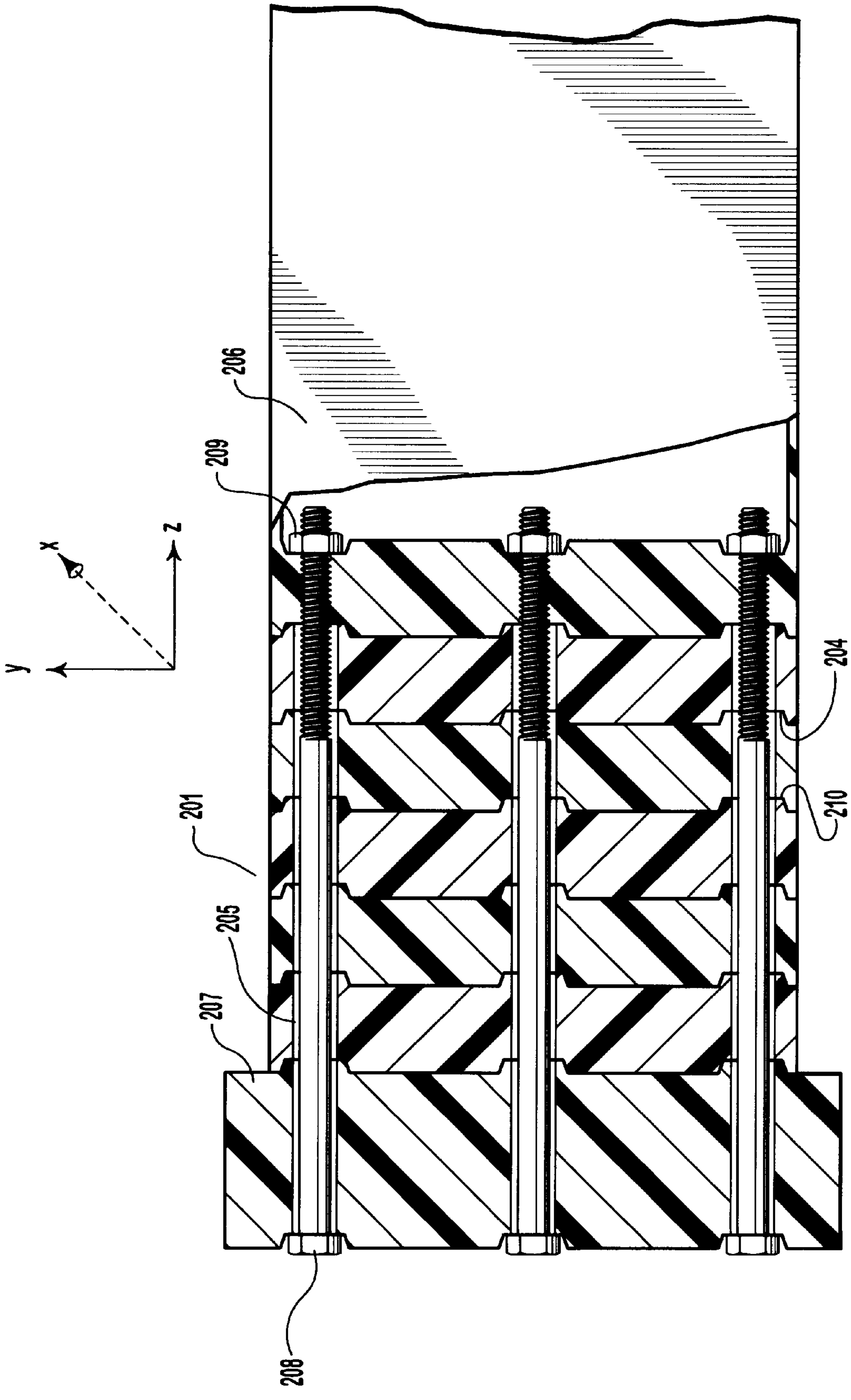

FIG. 2*c* depicts a side view of several stacking or nesting blocks in use on a wheelchair frame.

Figure 3B:
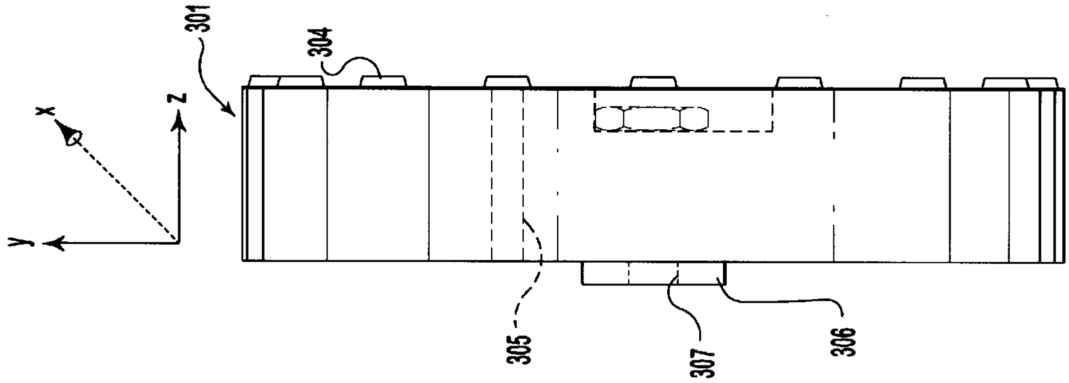
Figure 3A:
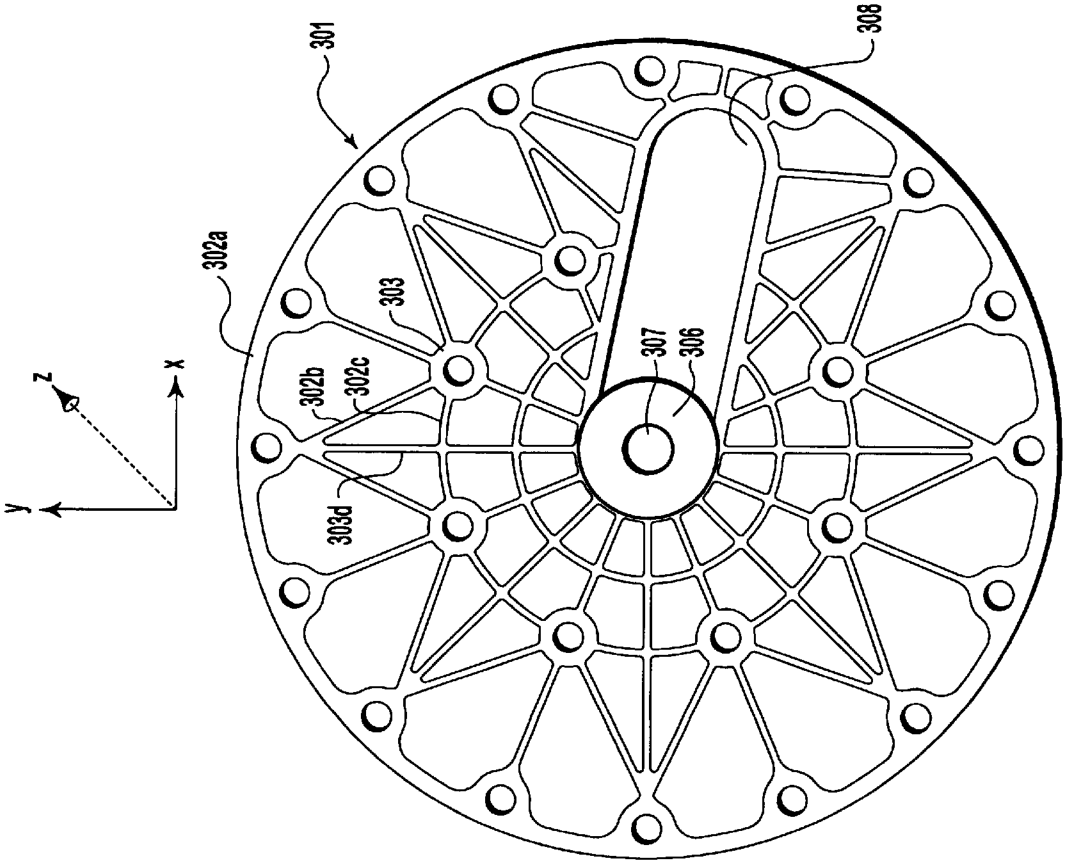

FIG. 3*a* depicts a plan view of one embodiment of a rotatable member with a slot for receiving a lug, the rotatable member being adapted to facilitate axle position adjustment with respect to a wheelchair frame to achieve rear axle position adjustment.

FIG. 3*b* depicts a side view of the rotatable member.

Figure 3D:
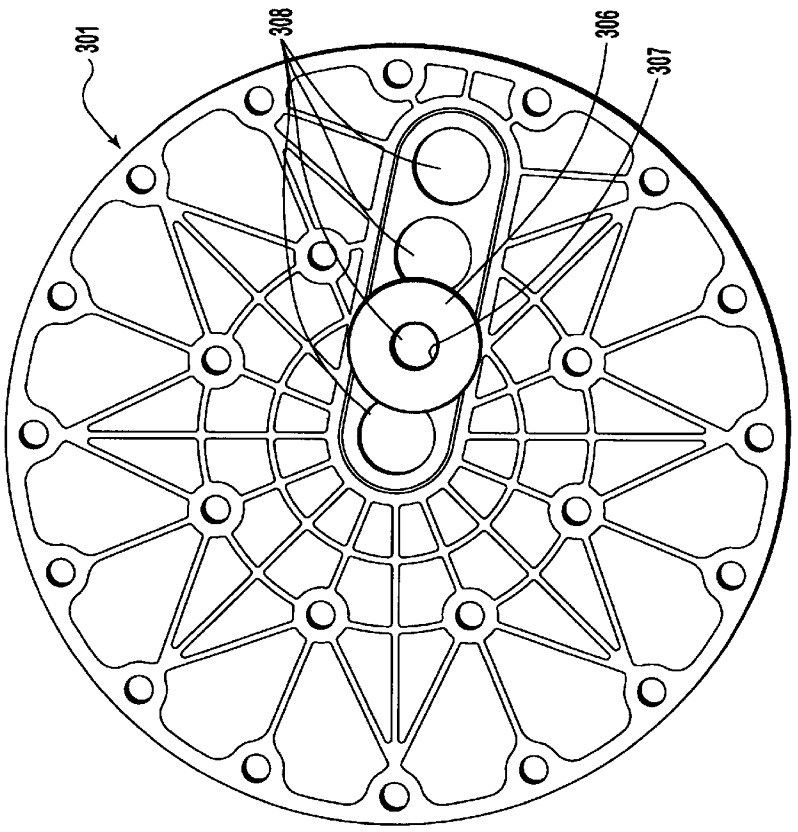
Figure 3C:
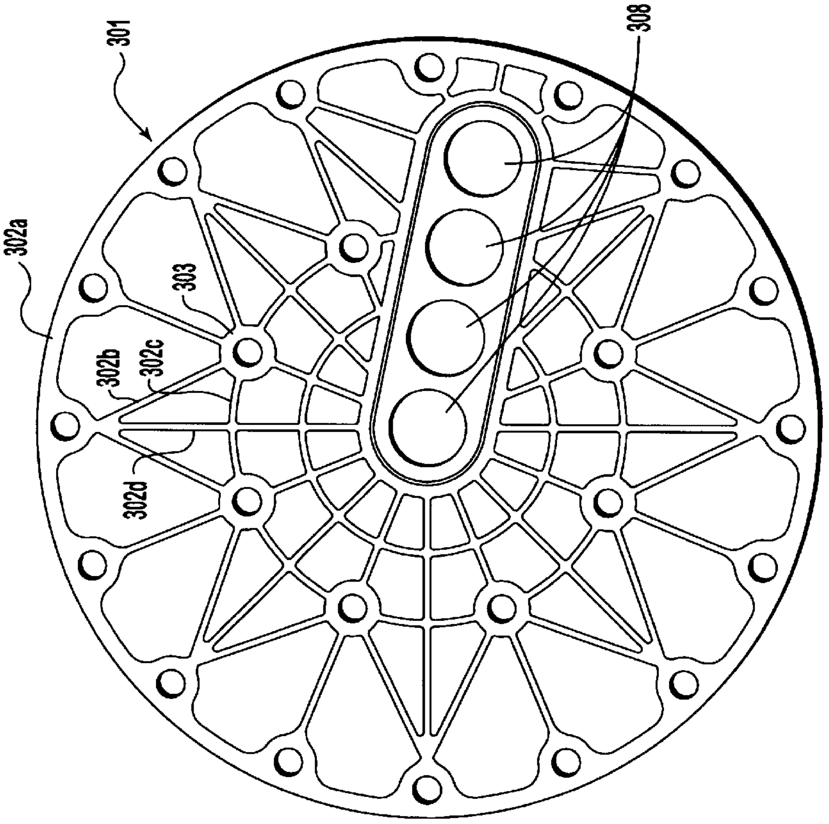

FIG. 3*c* depicts a plan view of another embodiment of a rotatable member with a plurality of receptacles for receiving a lug, the rotatable member being adapted to facilitate axle position adjustment with respect to a wheelchair frame to achieve rear axle position adjustment.

FIG. 3*d* depicts a plan view of another embodiment of a rotatable member with a plurality of receptacles for receiving a lug, and a lug positioned at one receptacle.

Figure 4:
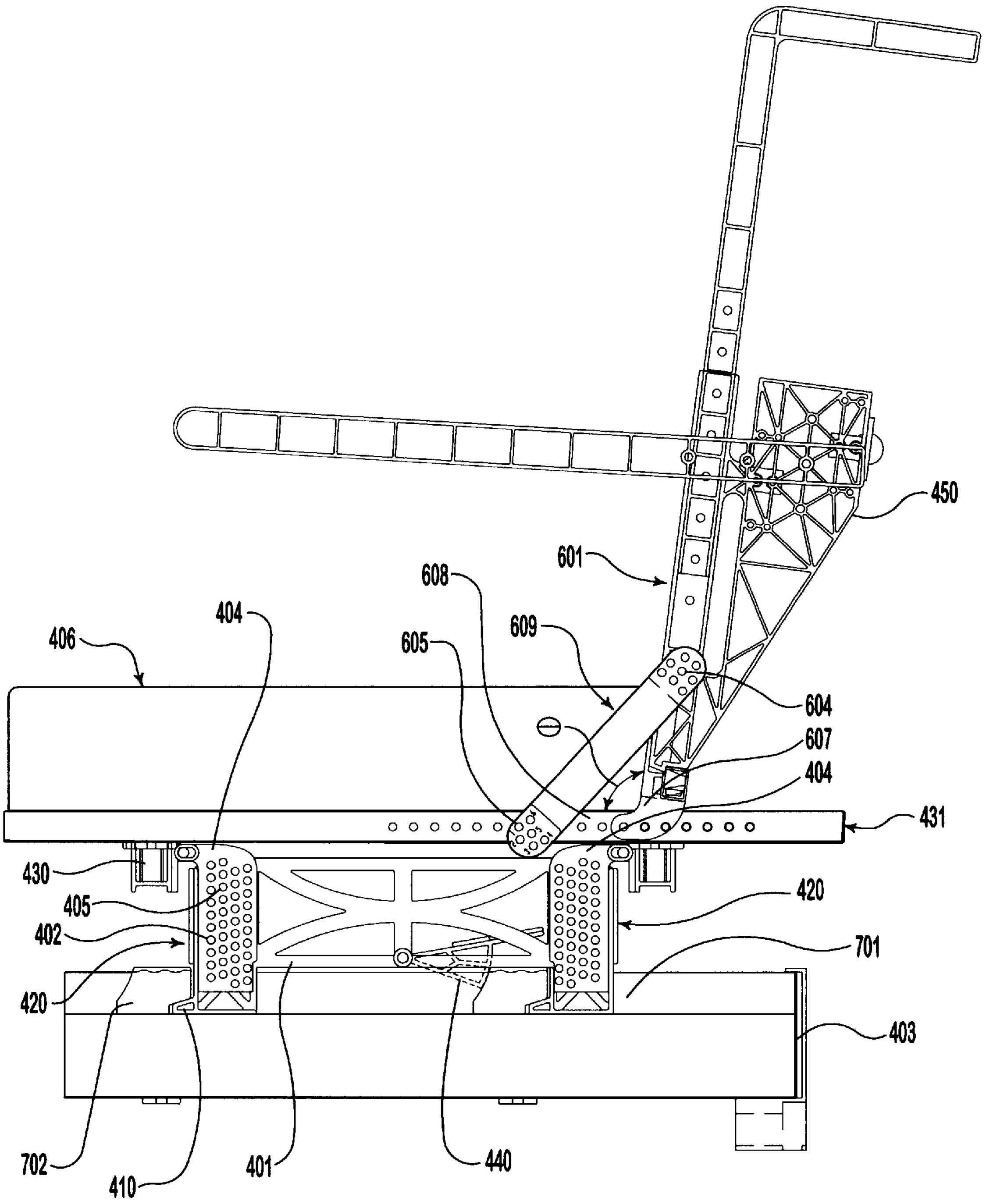

FIG. 4 depicts a side view of a wheelchair seat embodying the height and bucketing angle adjustment feature, the seat base width and length adjustment feature, the seat back angle adjustment feature, and the seat fore and aft position adjustment feature of the invention.

Figure 4A:
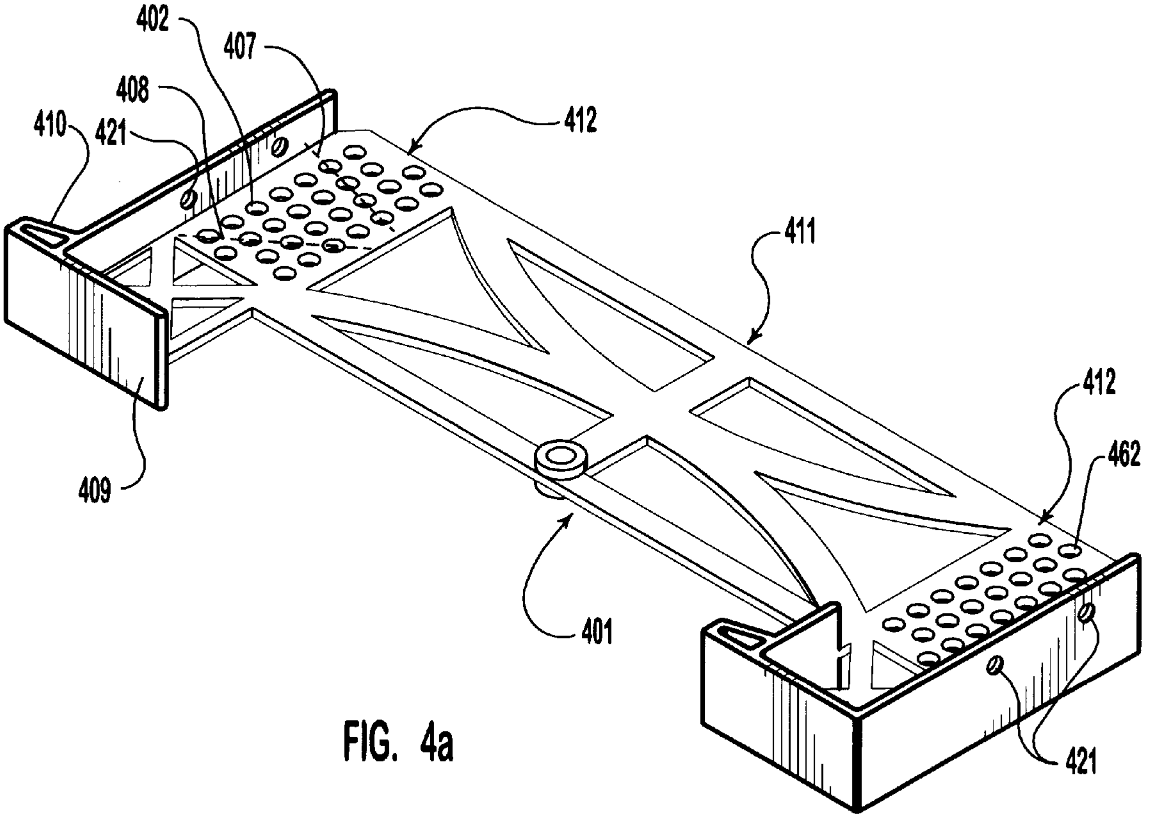

FIG. 4*a* depicts a perspective view of a base member used by the seat height and bucketing angle adjustment feature.

Figure 4B:
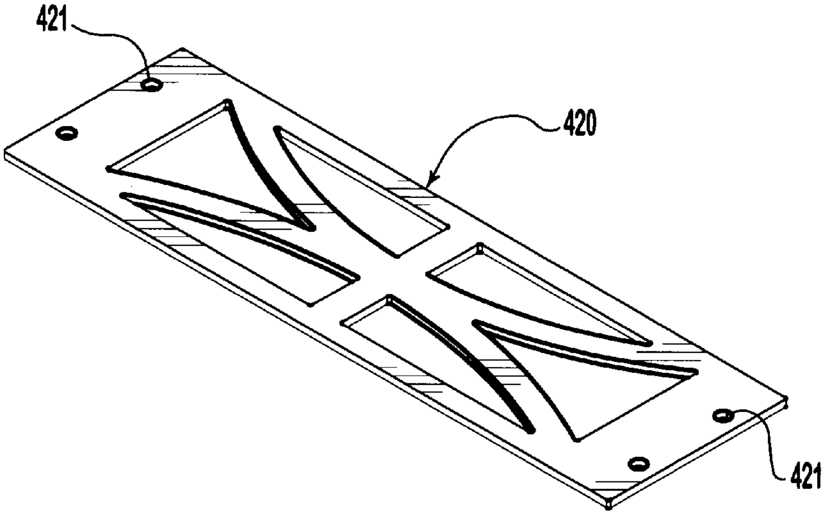

FIG. 4*b* depicts a perspective view of a connecting panel used by the seat height and bucketing angle adjustment feature.

Figure 4C:
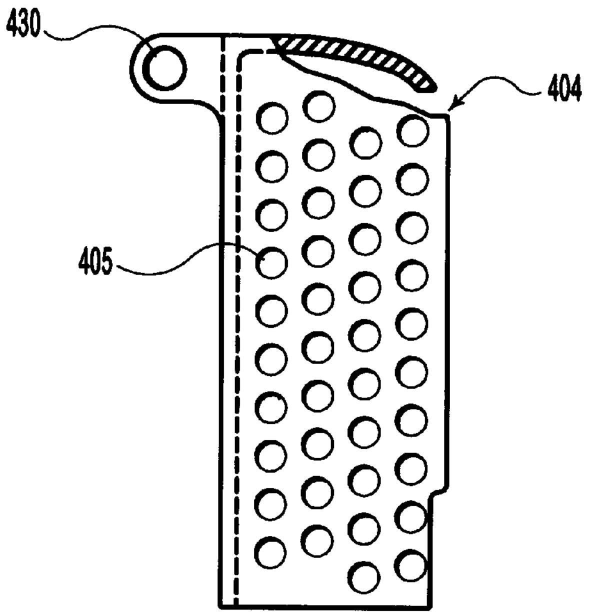

FIG. 4*c* depicts a side view of a riser used by the seat height and bucketing angle adjustment feature.

Figure 4F:
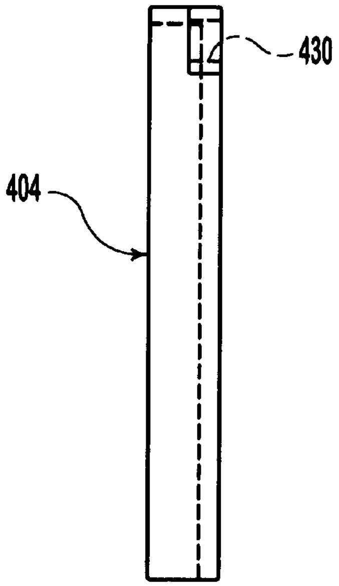
Figure 4D:

FIG. 4*d* depicts a top view of the riser with a partial cut-away.

Figure 4E:
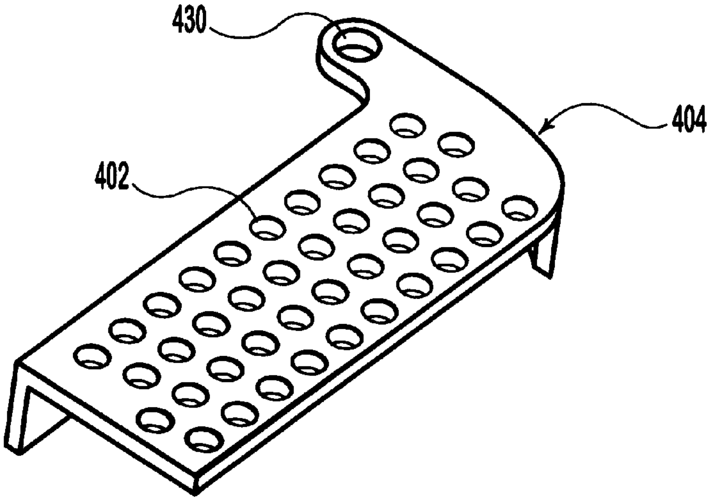

FIG. 4*e* depicts a perspective view of the riser.

FIG. 4*f* depicts a front view of the riser.

Figure 5A:
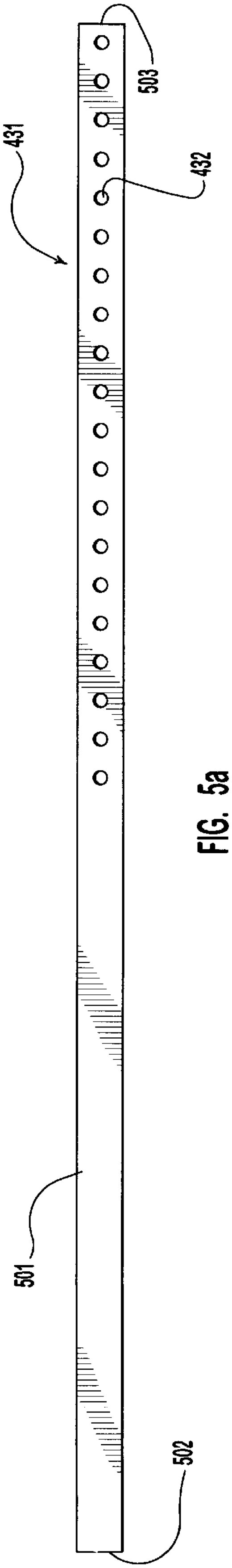

FIG. 5*a* depicts an elevation view of a seat beam of the wheelchair seat base width and length adjustment feature of the invention.

Figure 5B:
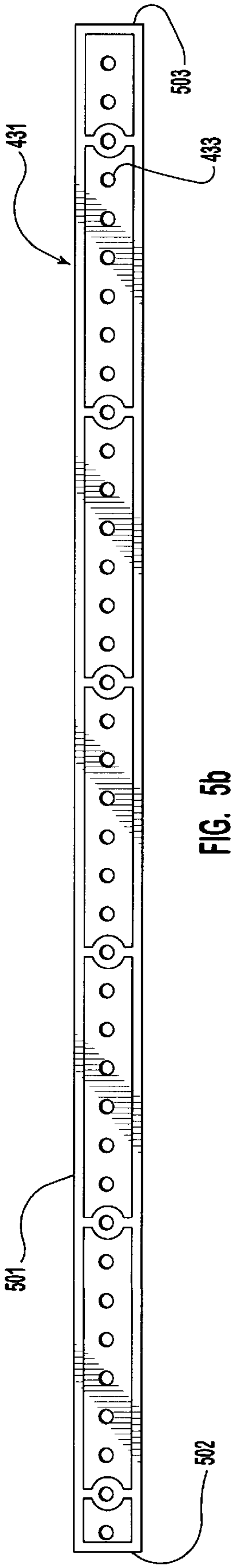

FIG. 5*b* depicts a plan view of a seat beam of the wheelchair seat base width and length adjustment feature of the invention.

Figure 5C:
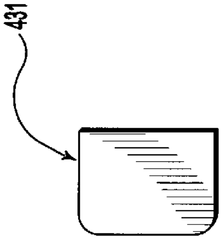

FIG. 5*c* depicts a side view of a seat beam of the wheelchair seat base width and length adjustment feature of the invention.

Figure 5D:
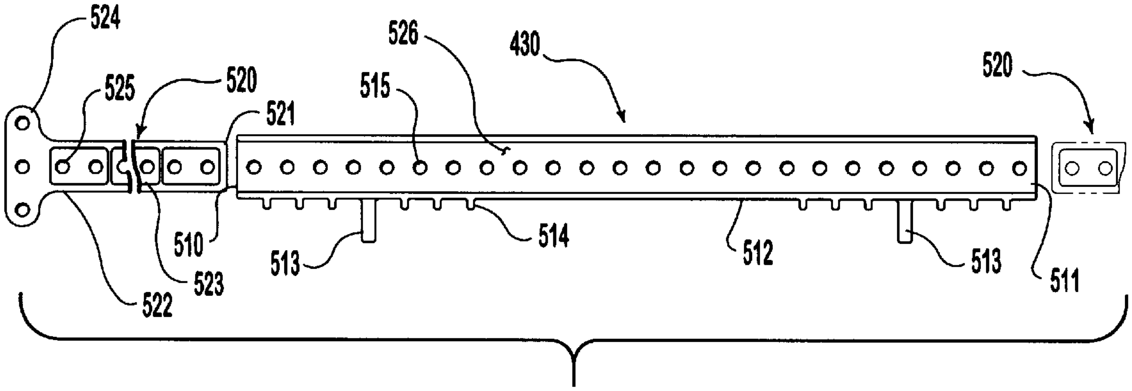

FIG. 5*d* depicts a plan view of a cross beam and cross beam extension of the wheelchair seat base width and length adjustment feature of the invention.

Figure 5E:
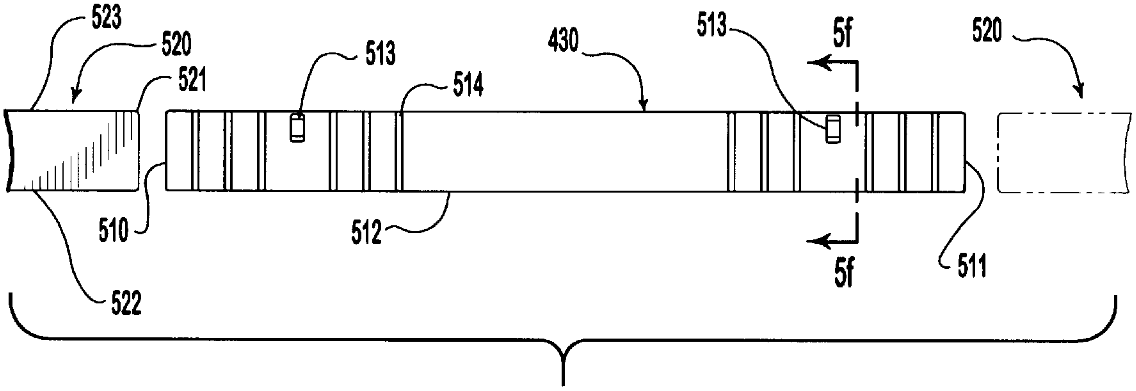

FIG. 5*e* depicts an elevation view of a cross beam and cross beam extension.

Figure 5F:
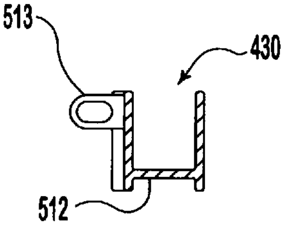

FIG. 5*f* depicts a side view cross section of a cross beam and cross beam extension.

Figure 5G:
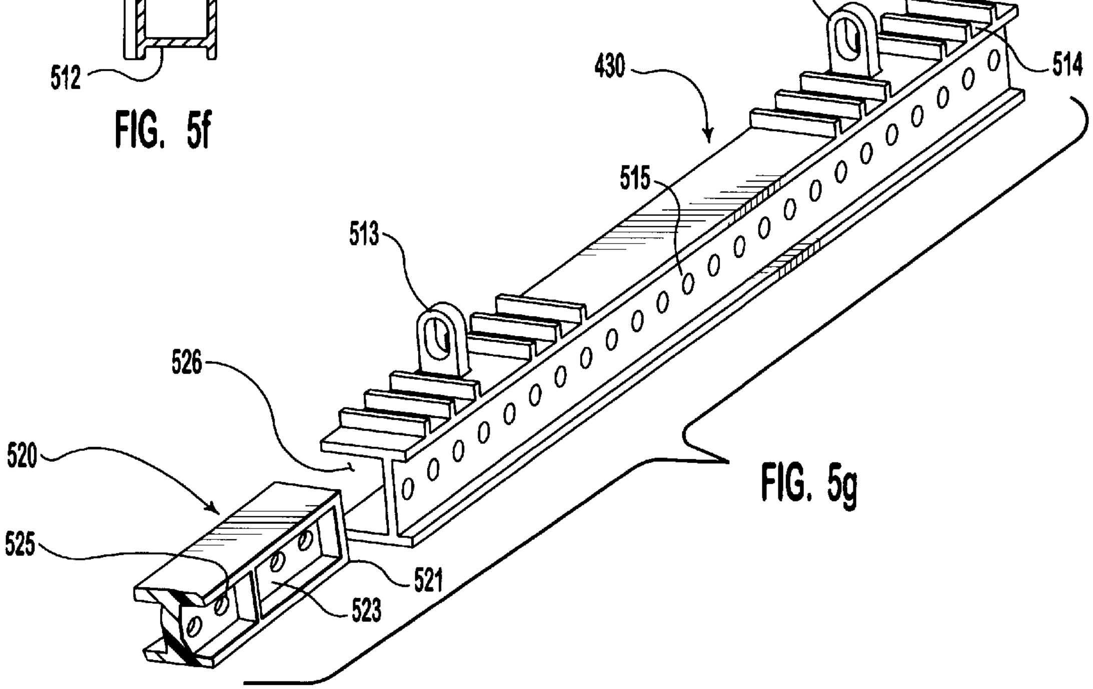

FIG. 5*g* depicts a perspective view of a cross beam and cross beam extension.

Figure 6A:
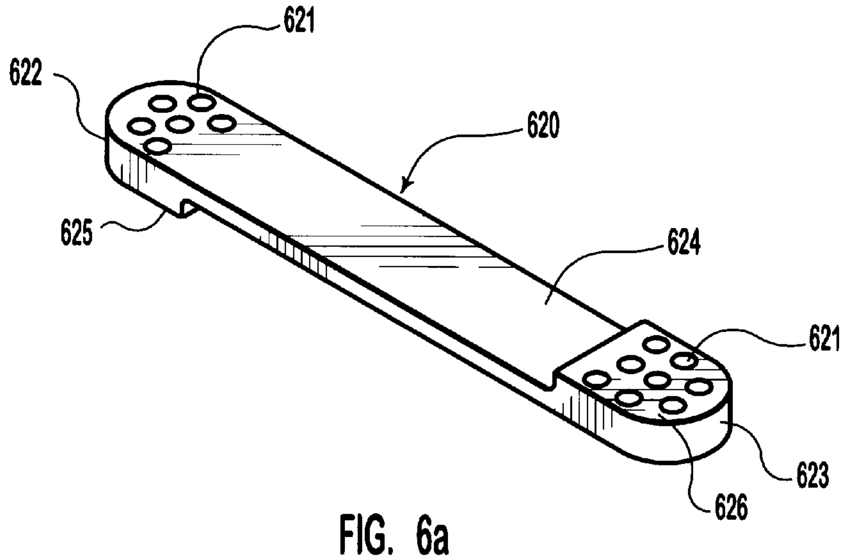

FIG. 6*a* depicts a perspective view of the preferred brace used in a wheelchair seat back angle adjustment feature.

Figure 6B:
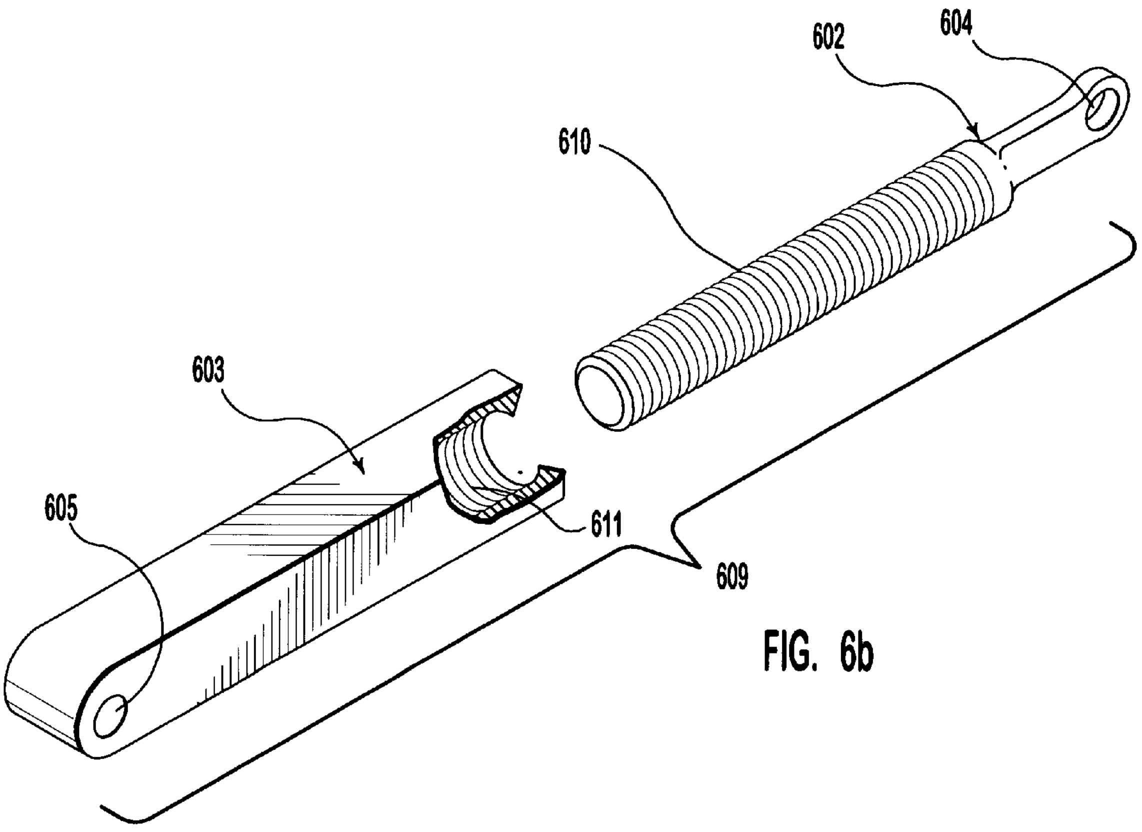

FIG. 6*b* depicts a perspective view of an alternative brace.

Figure 7A:
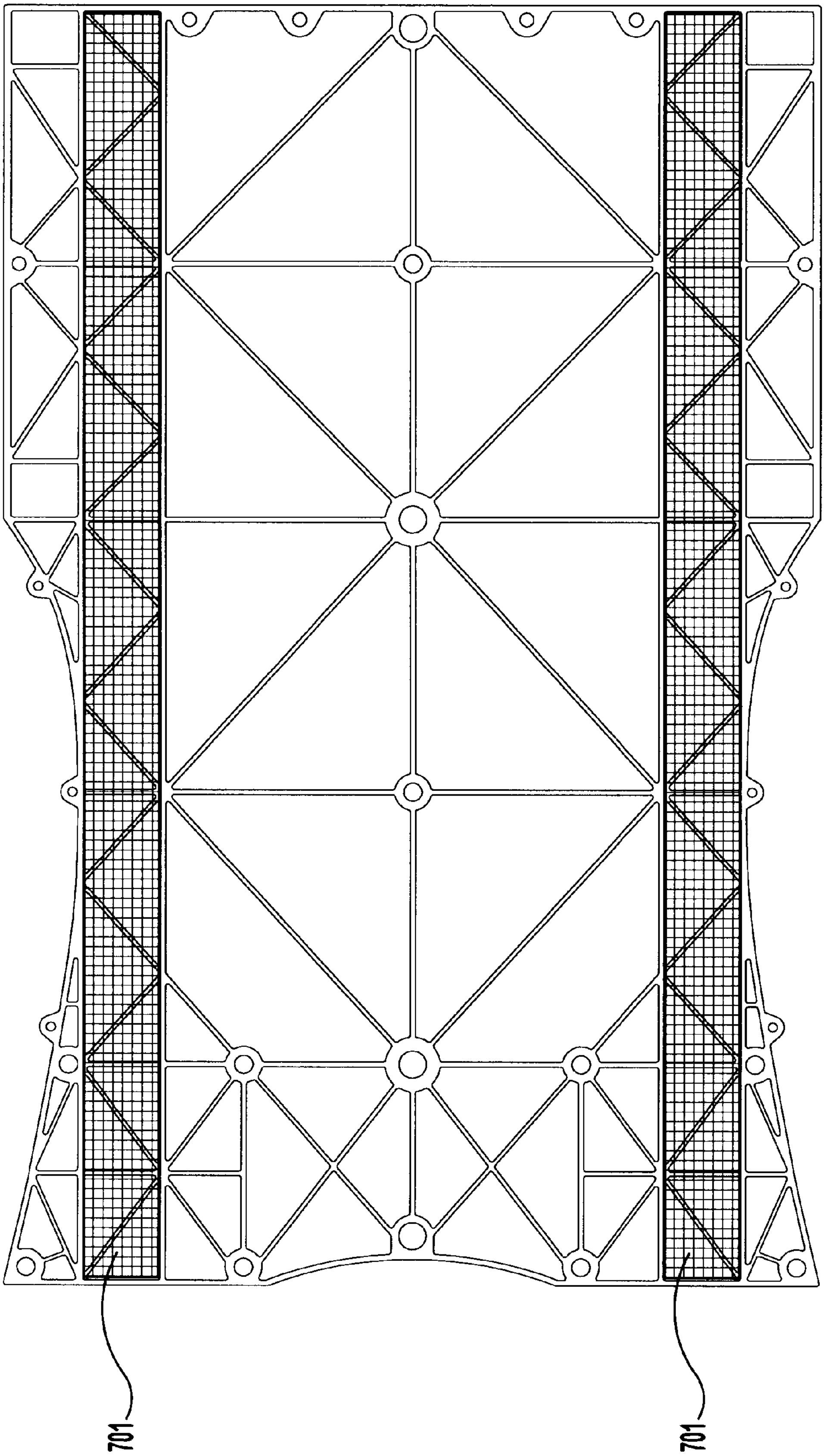

FIG. 7*a* depicts a plan view of a wheelchair frame with a track in it to accommodate wheelchair seat fore and aft position adjustment.

Figure 7B:
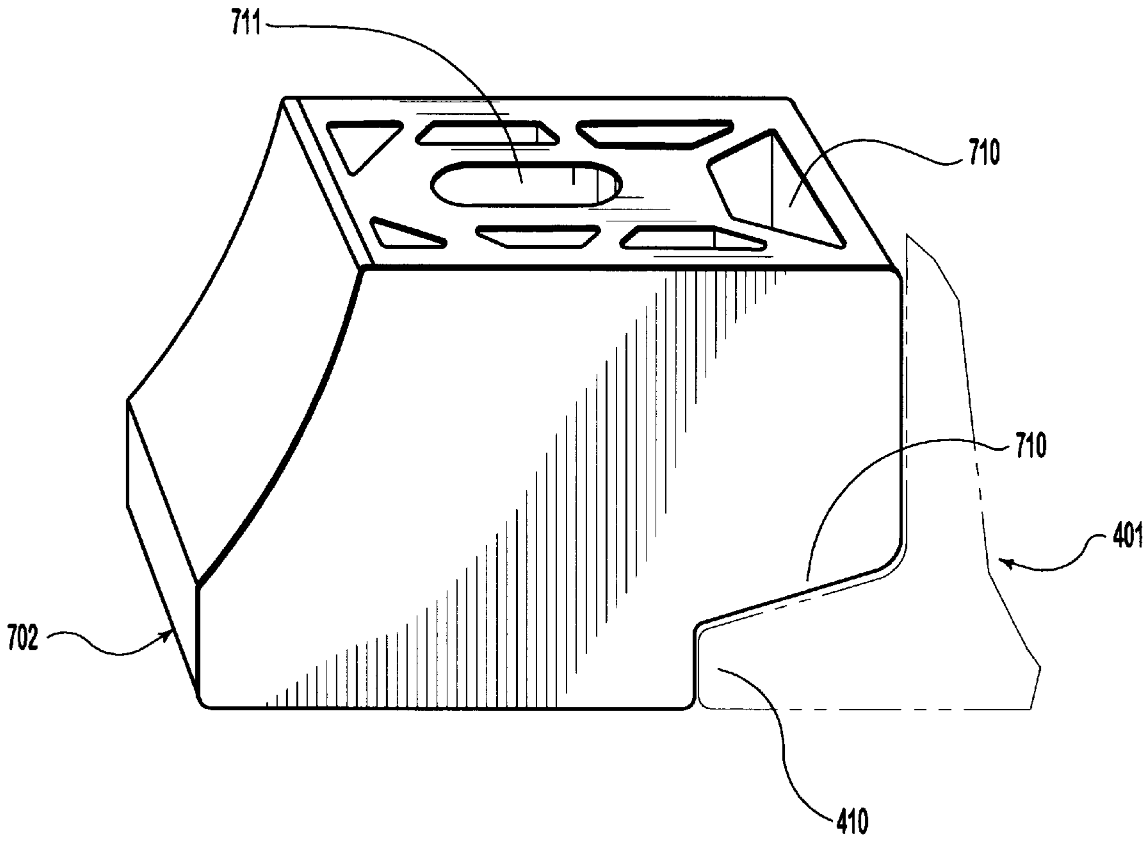

FIG. 7*b* depicts a perspective view of a retainer used in one embodiment of the wheelchair seat fore and aft position adjustment feature.

FIGS. 8–10 depict prior art wheelchair caster wheels.

IV. DESCRIPTION OF THE PREFERRED EMBODIMENTS

FIG. 1*a* depicts a side view and FIG. 1*b* depicts a rear view of a wheelchair embodying all six (6) adjustment features of the present invention. Shown is a wheelchair providing a wheelchair frame width adjustment feature 1, a wheelchair rear axle position adjustment feature 2, a wheelchair seat height and bucketing angle adjustment feature 3, a wheelchair seat base width and length adjustment 4, a wheelchair seat back angle adjustment feature 5 and a wheelchair seat fore and aft position adjustment feature 6. Also shown is the invented wheelchair wheel caster fork 101. Each of these features is described in greater detail below.

A. Truss Structure Caster Fork

Referring to FIG. 1*a,* a wheelchair wheel truss structure caster fork 101 is shown. The truss structure caster fork 101 includes an upper mounting structure 109 for mounting the caster fork to a wheelchair, a lower mounting structure 102 for mounting a wheel 108 to the fork, the lower mounting structure 102 having a plurality of mounting holes or attachments. It can be seen that the lowest mounting hole trails the point of mounting the upper mounting structure 109 to a wheelchair, and that as the wheel 108 height mounting is increased by using higher mounting holes, the wheel further trails the upper mounting structure 109 point of attachment. This is in contrast to prior art truss structures such as those of FIG. 10 where use of a higher mounting hole causes the wheel to trail the point of attachment by less distance. The truss structure caster fork 101 also includes a central section 104 located between the upper and lower mounting structures, the central section 104 being an elongate truss structure and including various parallel plates 104 105 and 106. The size, shape and relationship of the plates comprising the truss structure of the invention can be described with reference to the x, y and z axes shown in FIG. 1*a*. Each plate of the truss structure is parallel to a common axis, in this case the z-axis (the z-axis extends out of the page in FIG. 1*a*). Other than being parallel to a common axis (which is the z-axis in FIG. 1*a*), the parallel plates of the invention may be of any shape, such as straight, curved, jagged, etc. In the preferred embodiment, the plates have enough thickness along the z-axis for rigidity but not so much thickness as to be difficult to injection mold. Usually, the plates will be thinner in a direction other than the z axis than they are in the direction of the z-axis. The plates may assume any orientation with respect to the x and y axes. The preferred truss structure caster fork of the invention is injection molded in either a steel or aluminum mold from long glass fiber reinforced structural thermoplastic polyurethane. For the purposes of the invention, fiber is considered long if it has a length that is more than about 300 times its width. The preferred fiber used in the invention is about 1 cm. long.

The inventive features of the truss structure wheelchair wheel caster fork are readily apparent to persons of ordinary skill in the art when compared with the prior art caster forks shown in FIGS. 8–10. In FIG. 8, a stamped sheet metal fork 801 is shown. It has only one wheel mounting position, it is not aesthetically appealing, it cannot be made from an inexpensive injection molding process, and it is heavy. FIG. 9 depicts a similar fork 901 with the same problems as 801. FIG. 10 depicts fork 1001 that includes a plurality of wheel mounting holes oriented so that if a higher mounting hole is used, the wheel will be closer to point where the fork mounts to the wheelchair than if a lower hole is used.

B. Wheelchair Frame Width Adjustment

FIG. 2*a* depicts a side view of a preferred embodiment of a block 201 usable in a stacked or nested fashion between wheelchair wheels and the wheelchair frame to provide wheelchair frame width adjustment. The block 201 shown is a lightweight truss structure capable of being manufactured by injection molding. Numerous thin plates 202*a*–202*f* make up the truss structure. The thin plates 202*a*–202*f* are each parallel to a common axis, in this case the z-axis (the z-axis extends out of the page in FIG. 2*a*). Other than being parallel to a common axis, the plates comprising the block may be of any shape. The truss structure of the preferred embodiment of the block 201 includes a plurality of interconnected thin plates in a varied array of sizes and orientation. Plate 202*a* serves as an exterior longitudinal support member, plate 202*f* serves as a lateral support member (although curved), plate 202*d* serves as an interior lateral support member, plates 202*b* and 202*d* serve as interior diagonal or cross support members, plate 202*e* is molded in a circular fashion to eliminate unneeded material and save weight and plate 203 is molded in a circular orientation to serve as an attachment boss.

The size, shape and relationship of the plates comprising the truss structure of the invention can be described with reference to the x, y and z axes shown in FIGS. 2*a*–2*c*. In the preferred embodiment, the plates all have substantial thickness (up to about 3 inches thick) in a first direction; in this embodiment they are thick along the z-axis for rigidity. Use of plates less than about 3 inches thick ensures easy ejection from the injection mold during the molding process, so a thickness of less than about 3 inches is preferred. Generally, the thick direction of a plate, in this case the direction along the z-axis, will be about 0.5 inches. The plates are thick in a second direction and thin in a third direction, the third direction being at a normal (perpendicular or 90 degrees) to the second direction. For example, plate 202*a* is thick in the direction of the z-axis and thick in the direction of the x-axis but thin in the direction of the y-axis.

Attachment boss 203 is comprised of a cylindrically-shaped plate which is thick along the z-axis and in a second direction circular about the z-axis, but is thin in a third direction normal to the second direction at each point on the circular path of the second direction. Each plate may be described similarly, being thick along the z-axis and in a second direction, while being thin in a third direction which is normal to the second direction. This design results in the total mass of material used to mold the block 201 being low with respect to the volume of space occupied by the block 201. A plate is considered "thin" in a particular direction if it is generally less than about 0.25 inches thick in that direction, although typically such plates will not exceed 0.125 inches thick and will be about 0.075 inches thick in the preferred embodiment.

Manufacture of one preferred embodiment of the invention is achieved using an injection molding process. The use of plates parallel to a common axis allows a split mold to part or separate along the common axis without disturbing the truss members (plates) and without leaving any areas of molded material that are thick in three directions and hence heavy.

In the preferred embodiment, the material used is thermoplastic (as opposed to thermoset plastic) filled with reinforcing fibers. Many materials suitable for injection molding are known in the art. In alternative embodiments of the invention, other materials could be used for manufacture of devices embodying the invention. Thermoplastic without reinforcing fibers, injectable metals, injectable quicksetting fiber-reinforced thermoset plastics, or any other injectable, quickly solidifying structural material could be used in other embodiments of the invention, such as NYLON 6 and NYLON 6-6 (generically referred to as "polyamides") available from DuPont, PPS (polyphenylene sulfide), high density polyethylene and polypropylene. The reinforcing material used in the preferred embodiment of the invention is graphite fiber commonly available commercially. The preferred embodiment uses standard modulus moderate strength TORAY T-700 (generically referred to as "graphite") and NYLON 6-6 thermoplastic. An equally suitable standard modulus standard strength fiber which could be used is HERCULES AS-4 (generically referred to as "graphite fiber"). Alternatively, intermediate modulus high strength graphite fibers such as TORAY M 30 and HERCULES IM-7 may be used. Aramid fibers such as KEVLAR 49 and TWARON as well as glass fibers such as E-glass and S2 glass available from Dow-Corning may be used. The thermoset plastic used in the preferred embodiment of the invention is NYLON 6-6 available from DuPont. Alternatively, PPS (polyphenylene sulfide), PET (polyethylene terephthalate), ABS (acrylonitrile butadiene styrene) or other structural thermoplastics could be used.

The truss configuration used in the preferred embodiment is shown in FIG. 2*a* generally triangular arrangements of the various plates parallel to a common axis. In other embodiments of the invention, other shapes could be used, such as square, rectangular, trapezoidal, polygonal, circular, etc. In another embodiment, rather than arranging all plates parallel to a common axis, some plates are arranged parallel to one or more secondary common axes.

In alternative embodiments of the invention, the blocks 201 could be of any shape such as square, round, octagonal or otherwise and would be made from almost any material, such as plastic, metal, wood, rubber or otherwise. The key to the invention is providing some type of spacers between the wheelchair wheels and the frame to provide wheelchair frame width adjustment.

FIG. 2*b* depicts a side view of block 201. The block 201 includes a plurality of protruding pegs 204, each peg 204 having a bolt hole 205 through its center. Also shown are a plurality of peg receptacles 210 which are recessed to accept pegs 204. The pegs 204 and peg receptacles 210 are considered a means for stacking or nesting blocks 201.

FIG. 2*c* depicts a plurality of blocks 201 installed on a wheelchair frame 205 by a plurality of bolts 208 projecting through fastener holes or attachment bosses 205 and being secured to the frame 206 by nuts 209 or any other attachment means. The bolts 208 projecting through fastener holes 205 are considered a means for attaching blocks 201 to a wheelchair frame. The pegs 204 of one block 201 protrude into the receptacle 210 of the next block 201, and the peg of the block 201 closest to the frame 206 protrudes into the frame 206. Protrusion of pegs 204 into blocks 201 and frame 206 combined with bolts 208 or other attachment means provides a width-adjustment feature which is rigid and secure from all directions. The pegs 204 and receptacles 210 also facilitate the stackable and nestable characteristic of the blocks. The pegs 204 permit the blocks 201 to withstand forces with respect to other blocks 201 or the frame 206 without substantial movement. In place of pegs 204, any means for firmly securing the blocks 201 along the x and y axes could be used.

There may be many variations of block 201 design. The truss structure used for the blocks 201 in the figures was chosen for its inherent strength, light weight, and low cost of manufacture. Almost any configuration could be used for the blocks 201, however. The important features for the blocks 201 are that they should be either smooth to facilitate stacking like traditional spacers or nestable so that they can be stacked in interlocking fashion as shown in the figures. The rectangular block shape shown in the figures may be changed as well while still achieving the purpose of the blocks. The dimensions of the blocks need be chosen to facilitate meaningful adjustment of wheelchair wheelbase width. In the preferred embodiment, blocks which are 0.5 inches thick are used to achieve one inch adjustment when the blocks are used in right/left pairs. Blocks of no more than one inch thick to accommodate adjustment in increments not greater than two inches are preferred, although any size could be used. Further, the blocks may be made of any structural material.

When the invented blocks are in use, the wheelchair user may install additional blocks on the wheelchair to achieve a wider wheelchair wheelbase width, or fewer blocks may be used if a narrower frame is desired. Equal adjustment on each side of the wheelchair is preferred although other adjustment is possible. Further, the invention could be modified to provide width adjustment to the front (caster) wheels of a wheelchair in other embodiments of the invention. A major advantage of the invented blocks is that they permit wheelbase width adjustment without sacrificing structural rigidity of the wheelchair.

C. Rear Wheel Axle Position

It is desirable to be able to change the position of the main (typically rear) wheel axle(s) of a wheelchair to (1) change the center of gravity of the rider relative to the wheels (e.g. by moving the axle forward or backward), (2) to change the rider's height from the ground, (3) to enable a change to wheels of different diameters while keeping the rider's height from the ground approximately constant, or (4) to shorten or lengthen the wheelchair wheelbase length.

This feature of the invention is a wheelchair axle receiver in the form of a rotatable member with at least one lug receptacle or slot for receiving a lug, into which lug the axle is inserted. FIGS. 3*a* and 3*b* show a preferred embodiment of the rotatable member of the invention. The preferred embodiment of the rotatable member 301 depicted in the plan view of FIG. 3*a* is about seven (7) inches in diameter and is injection molded from composite materials in the form of a truss structure. The truss structure is comprised of numerous interconnected and mutually supporting plates, such as circumferential rim 302*a*, interior circumferential support plate 302*c*, interconnecting support plates 302*b* and 302*d*, and attachment boss 303 (formed by a cylindrical rather than a flat plate). The truss structure, molding and materials are as described in the text accompanying FIGS. 2*a*–2*c* above.

This preferred embodiment of the invention includes a rotatable member 301 comprising an elongated lug receptacle 308 to permit sliding adjustment of lug 306 within receptacle 308. The lug 306 (not a part of the rotatable member 301) includes an axle receptacle 307 for receiving an axle on which a wheelchair wheel may rotate.

FIG. 3*b* depicts a side view of the rotatable member 301. Shown are lug 306 protruding through lug receptacle 308, and pegs 304 each with its own center hole 305 for receiving a bolt for firm attachment to blocks 201 and/or to a wheelchair frame. The pegs 304 function generally as set forth in the description referring to pegs accompanying FIGS. 2*a*–2*c*. The pegs 304 facilitate firm engagement of the rotatable member 301 with blocks 201 and/or to a wheelchair frame having receptacles for the pegs of either the blocks 201 or the rotatable member 301. This permits stacking or nesting of the rotatable member 301 with a plurality of blocks 201. The pegs also ensure that the rotatable member, blocks, and frame will be rigidly engaged to each other and will provide adequate structural rigidity for supporting a wheelchair axle.

FIGS. 3*c* and 3*d* show another preferred embodiment of the rotatable member of the invention. The preferred embodiment of the rotatable member 301 depicted in the plan view of FIG. 3*c* is about seven (7) inches in diameter and is injection molded from composite materials in the form of a truss structure. The truss structure is comprised of numerous interconnected and mutually supporting plates, such as circumferential rim 302*a*, interior circumferential support plate 302*c*, interconnecting support plates 302*b* and 302*d*, and attachment boss 303 (formed by a cylindrical rather than a flat plate). The truss structure, molding and materials are as described in the text accompanying FIGS. 2*a*–2*c* above.

This preferred embodiment of the invention includes a rotatable member 301 comprising a plurality of lug receptacles 308 to permit discrete adjustment of lug 306 within one of receptacles 308. FIG. 3*d* shows a lug 306 (not a part of the rotatable member 301) including an axle receptacle 307 for receiving an axle on which a wheelchair wheel may rotate.

In use, the lug 306 can be attached inside a lug receptacle 308 by any attaching means known in the mechanical arts, such as the preferred means of threading it into a nut. The lug 306 can be loosened and slid or inserted within a lug receptacle 308 and reattached at any location therein, providing infinite or discrete adjustment within the confines of the receptacle. Depending on the rotational position of the rotatable member 301 with respect to the wheelchair frame, this adjustment may bring about a forward/rearward adjustment or a vertical adjustment of the wheelchair axle with respect to the wheelchair frame, or a combination of the two.

Adjustment of the wheelchair axle with respect to the frame can also be accomplished by detaching (such as unbolting) the rotatable member from the blocks/frame, rotating the rotatable member with respect to its center, and rebolting the rotatable member to the blocks/frame. The rotation causes a change in the position of receptacle(s) 308 with respect to the wheelchair frame and can be used for forward/rearward and/or vertical adjustment of the wheelchair axle lug 306 with respect to the wheelchair frame. With the combination of adjustment of lug 306 within receptacle (s) 308 and rotation of rotatable member 301, the lug 306 can be adjusted to almost any position on an interior circle within the rotatable member 301. This feature of the invention provides greater two-dimensional wheelchair axle adjustability than known in prior wheelchairs and virtually infinite adjustment within the range of the rotatable member 301 (rather than adjustability constrained by specific increments as provided in prior wheelchairs). This feature of the invention permits vertical adjustability of an axle lug with respect to a frame by use of a single set of fastener holes for attachment of the rotatable member, rather than having numerous fastener holes for various position adjustments.

In other embodiments of the invention, the rotatable member need not be circular, but could be hexagonal or any other shape as long as a repeating bolt hole pattern is provided that allows rotation of the member and hence adjustment. Alternatively, another type of attachment means that allows such rotation could be used. The member need not be in the truss configuration shown either, but could be in any other shape or configuration including square, octagonal, solid, etc. In another preferred embodiment, lug receptacle 308 need not be as shown, but could instead traverse the entire face of the rotatable member, be oblique to the center of the rotatable member, be angled, be curved rather than straight, or be in some other configuration. Alternatively, a plurality of lug receptacles 308 could be arranged in any suitable pattern within device 301 including, but not limited to, axial, radial, arcuate or chorduate. Although the rotatable member is about 1.7 inches deep in the preferred embodiment, any other depth could be used. The key to the invention is that through a combination of rotational and axle adjustment, the rotatable member provides vertical adjustment and lateral adjustment of wheelchair wheels with respect to the wheelchair's frame.

D. Seat Height and Bucketing Angle

Adjustment of wheelchair seat height relative to the wheelchair frame and of the front to back angle of the seat (the seat bucketing angle) are desirable features on a wheelchair. If the seat height adjustment is such that the front of the seat can be adjusted to a different height than the rear of the seat, both seat height and bucketing angle adjustment features are provided. These adjustments are useful in accommodating wheelchair users with varied knee-to-foot dimensions and are superior to prior wheelchair telescoping footrests because telescoping footrests cannot be telescoped down beyond a certain point without impeding wheelchair movement due to low ground clearance. The seat height and bucketing angle feature of the invention has no such limitation. Additionally, many wheelchair users prefer to have a high wheelchair seat but do not want to raise the height of the wheelchair frame above the ground. Additionally, even if the wheelchair frame were raised, it may not provide the wheelchair user the desired seating height, so vertical seat adjustment such as that provided by the invention would still be required.

Seat bucketing angle is important in keeping the rider, who is often paralyzed in the lower extremities, from sliding out of the wheelchair seat. Some riders prefer a higher (i.e. more vertical) bucketing angle and some prefer a lower angle (i.e. more horizontal). It is desirable to permit each wheelchair user to experiment with bucketing angle to find the angle that is comfortable and safe for that user, and to change the bucketing angle as the wheelchair user's needs change over time, rather than being committed to a single bucketing angle from the date of wheelchair purchase.

Referring to FIG. 4, one preferred embodiment of the seat height and bucketing angle adjustment of the invention is shown. In this embodiment, a rigid base member or side panel 401 with a plurality of fastener holes 402 therein is provided. The base member 401 may be integral with the wheelchair frame 403 or it may be rigidly attachable to the frame 403. As depicted, retainers 702 fasten the base member 401 to the frame 403. Fastened to the base member 401 (such as by bolting or pinning) are four (4) risers 404 connected to cross beams 430 which are in turn connected to seat beams 431. The risers 404 are adapted in surface shape and bolt hole 405 configuration for attachment to the base member 401 and its fastener holes 402. The risers 404 are either integral with the wheelchair seat 406 or are adapted to be affixed to it. Two base members 401 on the two lateral sides of the wheelchair frame 403 are separated and supported by two connecting panels 420 (front and rear). The arrangement of the components of the invention identified thus far is such that all four (4) risers can be raised or lowered by the same amount, causing a purely vertical adjustment of the seat 406 with respect to the frame 403. This allows the seat 406 to be raised and lowered, keeping the bucketing angle constant. Alternatively, either the front or rear of the seat 406 may be raised or lowered a greater amount than the other, causing an increase or decrease in the seat bucketing angle as desired. A combination of seat height and bucketing angle adjustment may also be made.

FIG. 4*a* shows a perspective view of the base member 401. It is configured as a flat plate with cut-outs for weight savings, although it could be made as an injection-moldable truss structure or in another shape from various materials. The base member 401 includes a longitudinal support section 411 separating two end portions 412 where holes 402 are found. The base member includes a plurality of fastener holes 402 to accommodate seat height and bucketing angle adjustment. In the preferred embodiment shown, the fastener holes 402 are arranged in four rows of fourteen (14) fastener holes per row, the rows being in a cascading pattern when viewed along phantom line 407 or along phantom line 408. The fastener holes 402 in the preferred embodiment are sized to accommodate 3/16 inch bolts. The preferred embodiment uses fastener holes 402 drilled on 0.290 inch horizontal centers and 0.300 inch vertical centers. Each column of holes is 0.075 inch lower on the base member 401 than the previous column, resulting in a cascading pattern and allowing fine adjustment of seat height and bucketing angle because each hole 402 is only slightly higher than or slightly lower than another hole. Also shown in FIG. 4*a* is the mounting footing 409 and toe 410 for mounting the base member 401 to the wheelchair frame 403 by retainer 702.

FIG. 4*b* shows a perspective view of a connecting panel 420. The connecting panels 420 separate and provide support between the base members 401 on the two lateral sides of wheelchair frame 403. The connecting panels 420 are an injection molded flat panel with cut-outs in the preferred embodiment, although a truss structure or any other means for separating and supporting the base members 401 could be used. The connecting panels 420 include fastener holes 421 for attaching the connecting panels to the base members 401.

FIG. 4*c* depicts a side view riser 404 apart from the rest of the wheelchair. FIGS. 4*d–f* provide top, perspective and front views respectively of the riser 404. The fastener hole pattern of the riser is a mirror image of that of the base member 401 in the preferred embodiment. Hole 430 is used for attaching the riser 404 to cross beam 430.

The combination of base members 401 and connecting panels 420 is bolted together into a rigid four-sided box which is firmly secured to the wheelchair frame. The risers 404 form four legs on which cross beams 430 and other components including a wheelchair seat 406 rest, and the cascading fastener holes 402 and 405 accommodate seat height and bucketing angle adjustment. Because the rows of holes 402 on the base member 401 cascade in a particular pattern, and the rows of holes 405 on the risers 404 cascade in a mirror image of the pattern of holes 402 on the base member 401, either the first and third or the second and fourth columns of holes 405 and 402 will match up at increments that are only half the vertical height between holes. This type of mutually-complementary cascading pattern between the risers 404 and the base members 401 allows a finer bucketing angle adjustment than if identical hole patterns were used in both the base members 401 and the risers 404. Seat height is adjusted by moving all four risers 404 up or down an equal amount. Bucketing angle (the angle of the seat 406 with the horizon) is adjusted by moving either the front or rear riser pair a greater or lesser amount than the other riser pair.

In practice, the seat height and bucketing angle adjustment feature could be achieved by any three-dimensionally rigid member, including the wheelchair frame itself or any attachment to the frame. The member could be one-piece or multiple pieces fastened together and fastened to the frame. Adjustable risers or legs would be required, but could have as few as three holes each or as many holes as desired. The hole patterns could be configured in any manner that ensures that as the risers are raised, one or more holes in the riser and rigid member match at small increments (less than one-half inch) of vertical adjustment.

Because the preferred embodiment of the invention does not utilize tubular members, it is well-suited for use on wheelchairs which do not have tubular frames, including shell frames and truss-structure frames. Another advantage of the invention is that the fastener holes used give a positive, unchanging height and bucketing angle adjustment, eliminating the prior wheelchair problem of a telescoping tube assembly which can easily slip out of adjustment without the user's knowledge. The invention accommodates maintaining a particular adjustment which may have been carefully prescribed by a physician or physical therapist. The invention's use of a finite bolt hole pattern allows the user to know the exact bucketing angle (by comparing the fastener holes used to a chart provided by the manufacturer) without the need for angle measuring equipment. Finally, the use of a finite bolt hole pattern for adjustment accommodates accurate adjustment of the two lateral sides of the wheelchair seat base so that they match each other, a difficult task when the prior telescoping tubes were used.

E. Seat Base Width and Length Adjustment

It is desirable to be able to change the width and length of the seat of a wheelchair to ensure proper fit with a wheelchair user. Wheelchair users tend to change in their own physical dimensions over time due to muscular atrophy or shrinkage, growth of young people, and other factors. Adjustment is also desirable to accommodate the comfort and preference of various wheelchair users of different sizes.

All known prior wheelchairs use the wheelchair frame members as a base for the wheelchair seat, whether the seat is a sling seat (fabric stretched from a lateral frame member to an opposite frame member) or a rigid seat (a rigid panel attached to the wheelchair frame). Thus, because the wheelchair frame width and length cannot be adjusted, the seat width cannot be adjusted. Even the wheelchair frame width adjustment feature described above will not change seat width, because the base frame width of the wheelchair (onto which the wheelchair seat is mounted in the preferred embodiment) remains the same irrespective of spacers being added between the frame and the wheels.

The wheelchair seat base width and length adjustment feature of the invention is provided by a combination of two seat beams 431 and two cross beams 430 (depicted in FIG. 4), each of which is adjustable with respect to the others. Referring to FIG. 4, the seat 406 is attached to a seat beam 431 on each of its lateral sides. The seat beams 431 rest on cross beams 430 front and back and the cross beams 430 are in turn attached to risers 404, seat legs, wheelchair frame, or other attachment means connectable to a wheelchair frame. The invention employs adjustable seat beams 431 and adjustable cross beams 430 to achieve a seat which is adjustable in both length and width. By attaching the seat 406 to adjustable seat beams 431 which in turn are attached to adjustable cross beams 430, a fully adjustable seat is achieved rather than permanently mounting a seat directly to a wheelchair frame as practiced in the prior art. The seat base can be adjusted in both width and length as shown in FIG. 4 and as later described.

FIG. 5*a* depicts an elevation view of a seat beam 431. The seat beam 431 includes a body portion 501 extending along a longitudinal axis between a first end 502 and a second end 503. Positioned along the longitudinal axis are a plurality of fastener holes 432 which accommodate front/rear adjustment of a seat back 601 along the seat beam 431. Inclusion of a plurality of mounting holes 432 accommodates adjustable front/rear positioning of the seat back 601 with respect to the seat beam 431. In alternative embodiments, the seat back could be slid within a slot or on a track on the seat beam 431 to achieve an equivalent means for adjusting longitudinal seat back position with respect to the seat beam 431.

FIG. 5*b* depicts a plan view of the seat beam 431. Included along the longitudinal axis of the seat beam 431 are a plurality of fastener holes 433 for attaching the seat beam 431 to cross beams 430. Use of a plurality of fastener holes 433 accommodates effective length adjustability of seat beams 431 with respect to cross beams 430. Any means for accommodating such width adjustability, such as a track or a slot on the seat beams in which pegs would be slidable and attachable to the cross beams 430, could be used. FIG. 5*c* depicts a side view of a seat beam 431.

FIG. 5*d* depicts a plan view, FIG. 5*e* depicts an elevation view, FIG. 5*f* depicts a side view and FIG. 5*g* depicts a perspective view of cross beam 430. The main cross beam body 430 includes a first end 510, a second end 511, and a base or body section 512 therebetween along a longitudinal axis. The body section 512 includes two (2) protruding tabs 513 for attachment to a riser 404. The body section 512 also includes a plurality of stiffener ribs 514 along its surface for stiffening its walls. Cross beam extension 520 is slidingly attachable to the cross beam body in the channel 526 of the cross beam by the fastener holes 525 shown. The cross beam extension 520 includes a first end 521, a second end 522 and a body 523 therebetween with an attachment tab 524 at the second end 522 for attachment to a seat beam 431. Adjustment is achieved by sliding cross beam extension 520 within the channel 526 of the cross beam 430 and fastening it at any position therein by use of holes 525 and 515. A cross beam extension 520 is provided at each end of the cross beam 430.

In use in the preferred embodiment, the seat 406 is attached to the seat beams 431 using holes 433 and fasteners (such as bolts). The seat back is attached to the seat beams 431 using holes 432 and fasteners. The seat beams 431 are then attached to cross beam extensions 520 at holes in the tabs 524 and holes 433 in the seat beams 431 in conjunction with fasteners, with the extensions 520 in turn being secured to the cross beams 430 in channel 526 by holes 515 on cross beams 430 and holes 525 on extensions 520 in conjunction with fasteners. Cross beams 430 are attached to risers 404 or otherwise mounted to the wheelchair frame by attachment tabs 513 and fasteners.

Seat base length adjustment is achieved by changing the location along the seat beam 431 at which the cross beams 430 and seat back 601 are attached (i.e. unbolting the seat beams from the cross beams and sliding the seat beams forward or backward, but typically keeping the seat back in a constant location relative to the cross beams to avoid simultaneous seat back position adjustment). By attaching the cross beams and seat-back further forward (i.e. to the front of the wheelchair) on the seat beam, the seat beam is moved backward relative to the wheelchair frame, and the sittable area of the seat is shortened. This results in a portion of the seat beams being unused and extending from the back of the seat. Seat base width adjustment is achieved by sliding the cross beam extensions in or out of the cross beams and re-attaching them thereto with bolts. This provides the user of a wheelchair with a simple, easy to use and effective means for adjusting wheelchair seat base width and length.

When adjustments are made in seat base width or length, it may be necessary to replace or adjust the wheelchair seat accordingly or a proper seat to seat beam fit may not be achieved. In various embodiments of the invention, one or more of the following key elements would be expected: (1) seat beams that are separate from the wheelchair frame; (2) the ability to attach cross beams and a seat back to a wheelchair at various positions along the seat beam; (3) means for lengthening and shortening the cross members; and (4) means for attaching the cross beams to the wheelchair frame (directly or indirectly).

F. Seat Back Angle Adjustment

It is desirable to be able to change the seat back angle θ between the seat back and the seat to accommodate rider comfort and proper rider positioning. The present invention accommodates very fine adjustment of the wheelchair seat back. In the preferred embodiment of the invention, the seat back may be adjusted in less than 2 degree increments. Referring to FIG. 4, one preferred embodiment of the invention for adjusting seat back angle θ is shown. Included are seat beam 431, seat back 601 and adjusting brace 609, the three forming a triangular shape comprised of a substantially horizontal member 608 (a portion of the seat beam), a substantially vertical member 607 (a portion of the seat back) and an angular member (hypotenuse) 609 which in this case is the adjusting brace. The adjusting brace 609 is attached to the seat beam and seat back, by the use of fastener holes 604 and 605 and bolts.

The essence of the invention is the use of a polygonal (preferably triangular) structure at the junction of the seat and seat back, with one or more of the members of the polygon being adjustable in length to effect a change in seat back angle.

FIG. 6*a* depicts a perspective view of the preferred embodiment of the brace. Shown is a one piece seat back angle adjusting brace 609. The brace 609 includes a body portion 624 having a longitudinal axis, a first end 622 at one end of the longitudinal axis and a second end 623 at the other end of the longitudinal axis. The one piece brace 609 includes a plurality of fastener holes 621 at each of its ends 622 and 623 for mounting to seat beams 431 and seat backs 601. The fastener holes 621 are carefully arranged such that the variety of distances between holes on the 622 end and holes on the 623 end provide fastening options that result in seat back angle θ adjustments of less than two degree increments. Selection of holes 621 at each end 622 and 623 of the brace 620 can be used to have an effectively longer or shorter angular member 609 of the triangular shape which is used to effect adjustment of seat back angle. Bolts are secured through holes 621 to secure the brace 620 to seat back 601 and seat beam 431.

In the figure, the first and second ends 622 and 623 each show a thickness, lobe or protrusion 625 and 626 away from the longitudinal axis running along the body section 624 in opposite directions from each other. The protrusions 625 and 626 are intended for increasing the bolt bearing strength. In other preferred embodiments, the holes 621 of a brace 620 may be arranged other than as depicted in the figure.

FIG. 6*b* depicts a perspective view of an alternative adjusting brace 609. The brace 609 is composed of a lower brace portion 603 and an upper brace portion 602, each including a bolt hole 605 and 604 respectively for attaching to the seat beam 431 and seat back 601 respectively. The lower brace 603 includes a threaded passage 611 within its interior for receiving threads 610 of the upper brace 602. Length of the brace 609 and hence seat back angle θ is changed by rotating either lower brace 603 or upper brace 602 with respect to the other to cause a lengthening or shortening of the brace 609 as threads 610 turn within passage 611. Lengthening the brace 609 increases the seat back angle θ while shortening the brace 609 decreases seat back angle θ. This lengthening or shortening of brace 609 should be performed on both sides of the wheelchair seat in equal amounts for proper seat back positioning.

The key aspect of the invention are the use of a polygonal structure at the junction of a wheelchair seat and seat back. The polygonal structure controls the angular relationship between the seat and the seat back, with one or more of the members of the polygon being adjustable in length such that the seat back angle can be adjusted in increments preferably of less than two degrees. The adjusting member of the polygon can operate by sliding, screwing, bolting into different holes, or any other means. The polygon can be a triangle, rectangle, or any solid/semi-solid piece in which a polygon can be inscribed.

G. Seat Fore and Aft Position Adjustment

It is desirable to be able to change the fore and aft (referred to in the alternative as "longitudinal") position of a wheelchair seat relative to the wheelchair frame. This permits the wheelchair user to change his center of gravity with respect to the wheelchair frame and the wheelchair wheels. By changing the center of gravity, wheelchair stability and tendency for tipping can be affected. Greater stability is desired by less active individuals, those who lack ordinary muscular strength, and those who have poor reflexes. Stability is typically important for elderly or very ill persons. Less stability is desired by people who wish to be able to easily raise the front wheels of the wheelchair off of the ground to go over curbs and other obstacles, although this also increases the danger of a wheelchair turnover or accident. Wheelchair seat fore and aft adjustment permits one wheelchair to accommodate both types of wheelchair users. Changing the fore and aft position of the wheelchair seat relative to the wheelchair frame also benefits the wheelchair user by permitting selection of an optimum knee-to-footrest position for both comfort and physical therapy purposes. When used in combination with the wheelchair rear wheel axle position adjustment feature described above, the user can adjust the wheelchair to achieve the combination center of gravity, rear wheel position and seat positioning appropriate for him.

Referring to FIG. 7*a*, a top view of a wheelchair frame 403 with a slot 701 therein is shown. Base members 401 previously described in the text accompanying FIG. 4 are slidingly adjustable for fore and aft position in the track 701 and firmly attachable therein by use of retainers 702. The track 701 can be any slot in a wheelchair frame or in any attachment to a wheelchair frame in which protruding portions of a seat base 401 or seat may slide fore and aft and be fastened. Alternatively the track 701 could be a rail on the wheelchair frame or similar attachment on which the seat base 401 or seat slides. Other means for providing fore and after position adjustment of a wheelchair seat or a wheelchair frame could also be used, and are collectively referred to herein as a "track."

Once the wheelchair user utilizes track 701 to slide a wheelchair seat to the desired position, a means for securing the seat in place with respect to the wheelchair frame must be employed. Referring to FIG. 4, a retainer 702 mating against a toe 410 of base 401 is used to secure the base 401 into the track 701. The retainer is shown in greater detail in FIG. 7*b*. A bolt hole or slot 711 is provided in the retainer 702 so that a bolt extending through the wheelchair frame and through the retainer 702 can draw the retainer toward the wheelchair frame and cause the retainer lip 710 to press the toe 410 of the base 401 against the wheelchair frame in the track 701, thereby firmly affixing the base 401 at any given position in the track 701. In place of bolts, pins or any other locking device could be used. The retainers 702 serve as a means for fixing or securing the position of the base members and seat in the track with respect to the wheelchair frame.

In the preferred embodiment of the invention, the track 701 is a one-inch deep, one-inch wide slot in the wheelchair frame. One such slot is located near the left side of the frame and a like slot is located near the right side. The seat base 401 and its toes 410 rest in these two slots. The seat base 401 is prevented from moving right or left in the track 701 by the edges of the tracks bearing on the edges of the seat base 401. The seat base 401 can, however, slide forward or aft as desired. When the seat base 401 is positioned as desired fore or aft, it is rigidly secured to the frame by the retainers 702 as described above.

In an alternative embodiment, the retainers 702 are slidably adjusted within the track 701 and the retainers 702 firmly affixed to the wheelchair frame (such as by bolting) when the desired retainer 702 position in track 701 is achieved. The base members 420 are then placed into the track 701 such that the toes 410 align under the retainer lips 710 and forward movement (movement in a first direction) of the base members is prevented. A latch 440 typical of many latches known in prior wheelchairs is then engaged to lock the base members into position and prevent their rearward movement (movement in a second direction). The latch prevents rearward movement of the seat base, the retainers prevent forward and vertical seat movement, and the track prevents lateral movement resulting in a seat that is rigidly attached to the wheelchair frame. Upon releasing the latch, however, the seat can be slid back out from under the retainers and up out of the tracks away from the wheelchair frame. This accommodates rapid disassembly of the wheelchair for storage or travel. The latch 440 in the preferred embodiments is a quick-release latch that firmly secures the wheelchair seat assembly in place when the latch is engaged. The latch may be disengaged by lifting it upwards, permitting the entire wheelchair seat assembly to be removed from the wheelchair frame. In this way, the seat can be quickly released for easy wheelchair disassembly and storage in an automobile or on an airplane. When used in conjunction with quick release wheelchair wheels, this feature will make the wheelchair convenient to disassemble and store as needed. Additionally, because the wheelchair can be broken down into various parts, less strength is required of the wheelchair user to transport or store the wheelchair because each component is necessarily smaller and lighter than a complete wheelchair.

The essential characteristics of the wheelchair seat fore and aft position adjustment feature are: (1) use of a wheelchair seat base separate from wheelchair frame, and (2) providing a means for disconnecting the seat base from the wheelchair frame, moving it forward or aft along a track and then reconnecting the seat base to the frame. An alternative embodiment of the invention providing a quick release seat feature includes (1) the placement of intermediate members (retainers) between the seat base and the frame, those intermediate members being slidable and re-securable with respect to the frame as described above, (2) the intermediate members being configured such that when the seat base is positioned next to them, they prevent the seat base from moving upward or forward (alternatively preventing aft rather than forward movement, depending on their orientation to the seat base), and (3) a latch mechanism that prevents the seat base from sliding away from the intermediate members, which when released, allows the seat base to be moved away from the intermediate members, and up and away from the wheelchair frame.

H. Combination of Multi-Adjustable Wheelchair Features

Any one of the six (6) wheelchair adjustment features described above may be singly included on a wheelchair, or any of them may be included together in any combination to achieve a multi-adjustable wheelchair.

While the present invention has been described and illustrated in conjunction with a number of specific embodiments, those skilled in the art will appreciate that variations and modifications may be made without departing from the principles of the invention as herein illustrated, described and claimed.

The present invention may be embodied in other specific forms without departing from its spirit or essential characteristics. The described embodiments are to be considered in all respects as only illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A mount for mounting a caster wheel to a wheelchair, the mount comprising:

an upper mounting structure adapted for mounting the mount to a wheelchair, a lower mounting structure adapted for mounting a wheel to the mount, and a central potion having a first end and a second end, said first end being in the vicinity of said upper mounting structure and said second end being in the vicinity of said lower mounting structure, wherein the mount is a cavity-molded truss structure having an xyz coordinate system and comprising:

a plurality of connected structural plates;

wherein most of said plates are parallel to the z-axis in a first direction;

wherein most of said plates are thick in a second direction which is normal to said first direction wherein most of said plates are thin in a direction which is normal to said first direction and to said second direction;

wherein said plates provide said truss structure with strength from directions of the x, y and z axes; and wherein said structural plates of said truss structure provide the mount with its structural strength.

2. A mount as recited in claim 1 wherein said mount comprises long glass fiber-reinforced structural thermoplastic polyurethane.

3. A mount as recited in claim 2 wherein at least some of said fibers have a length that is about 300 times their width or more.

4. A mount for mounting a caster wheel to a wheelchair, the mount comprising:

an upper mounting structure adapted for mounting the mount to a wheelchair, a lower mounting structure adapted for mounting a wheel to the mount, and a central potion having a first end and a second end, said first end including said upper mounting structure and said second end including said lower mounting structure, said central portion including a plurality of connected structural plates from which the truss structure caster fork derives strength and rigidity;

wherein most of said plates are parallel to the z-axis in a first direction;

wherein most of said plates are thick in a second direction which is a direction other than the direction of the z-axis;

wherein most of said plates are thin in a direction which is normal to said first direction and which is normal to said second direction.

5. A mount as recited in claim 4 wherein said mount comprises long glass fiber-reinforced structural thermoplastic polyurethane.

6. A mount as recited in claim 5 wherein at least some of said fibers have a length that is about 300 times their width or more.

7. A mount for mounting a caster wheel to a wheelchair, the mount comprising:

an upper mounting structure adapted for mounting the mount to a wheelchair, a lower mounting structure adapted for mounting a wheel to the mount, said lower mounting structure including a plurality of mounting holes to accommodate mounting of a wheel, said mounting holes being arranged to form an uppermost mounting hole that is the highest caster wheel mounting hole in an assembled wheelchair, a lowermost mounting hole that is the lowest caster wheel mounting hole in an assembled wheelchair, and central mounting holes that are located between said uppermost mounting hole and said lowermost mounting hole, so that if one of the holes other than the lowermost mounting hole is used to mount a caster wheel to the mount, the wheel will be offset from the point at which said upper mounting structure attaches to the wheelchair by a greater distance than if the lowermost mounting hole is used, and a central portion having a first end and a second end, said first end including said upper mounting structure and said second end including said lower mounting structure, said central portion including a plurality of connected structural plates from which the mount derives strength and rigidity;

wherein most of said plates are parallel to the z-axis in a first direction;

wherein most of said plates are thick in a second direction which is a direction other than the direction of the z-axis;

wherein most of said plates are thin in a direction which is normal to said first direction and which is normal to said second direction.

8. A mount as recited in claim 7 wherein said mount comprises long glass fiber-reinforced thermoplastic polyurethane.

9. A mount as recited in claim 8 wherein at least some of said fibers have a length that is about 300 times their width or more.

* * * * *